United States Patent
Shimizu et al.

(10) Patent No.: US 9,699,090 B2
(45) Date of Patent: Jul. 4, 2017

(54) TRANSFER DEVICE, CONTROL DEVICE, AND TRANSFER METHOD

(71) Applicant: FUJITSU LIMITED, Kawasaki-shi, Kanagawa (JP)

(72) Inventors: Sho Shimizu, Kawasaki (JP); Toshio Soumiya, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 484 days.

(21) Appl. No.: 14/512,550

(22) Filed: Oct. 13, 2014

(65) Prior Publication Data
US 2015/0109896 A1 Apr. 23, 2015

(30) Foreign Application Priority Data

Oct. 22, 2013 (JP) ................................. 2013-219657

(51) Int. Cl.
| | |
|---|---|
| *H04L 12/28* | (2006.01) |
| *H04L 12/43* | (2006.01) |
| *H04J 3/00* | (2006.01) |
| *H04L 12/813* | (2013.01) |
| *H04L 12/24* | (2006.01) |
| *H04L 12/931* | (2013.01) |
| *H04L 12/947* | (2013.01) |

(52) U.S. Cl.
CPC .......... *H04L 47/20* (2013.01); *H04L 41/0681* (2013.01); *H04L 41/0686* (2013.01); *H04L 49/00* (2013.01); *H04L 49/25* (2013.01)

(58) Field of Classification Search
CPC ................................ H04L 12/56; H04L 12/28
See application file for complete search history.

(56) References Cited

U.S. PATENT DOCUMENTS 5,450,406 A * 9/1995 Esaki .................. H04L 12/4608
370/396
6,421,321 B1 7/2002 Sakagawa et al.
(Continued)

FOREIGN PATENT DOCUMENTS

| JP | 10-242977 | 9/1998 |
|---|---|---|
| JP | 2007-288464 | 11/2007 |

(Continued)

*Primary Examiner* — Brian Roberts
*Assistant Examiner* — Abu-Sayeed Haque
(74) *Attorney, Agent, or Firm* — Staas & Halsey LLP

(57) ABSTRACT

A transfer device in a network including a plurality of control devices includes a network connection device, memory, and a processor. The network connection device communicates a target packet as a target of a transferring process. The memory stores a transfer rule received by the network connection device from a determination device as a control device for determining a transfer rule indicating a method of a process performed by the transfer device. The processor judges whether or not disable information indicating that the transfer rule is not to be acquired from the determination device when a transfer rule applicable to the target packet is not stored in the memory is included in the target packet. When the disable information is included, the processor outputs the target packet to the network connection device without requesting the transfer rule. The network connection device transmits the target packet to another transfer device.

14 Claims, 21 Drawing Sheets

(56) References Cited

U.S. PATENT DOCUMENTS

| | | | | |
|---|---|---|---|---|
| 7,443,872 B1* | 10/2008 | Corbett | ............... | H04L 12/66 |
| | | | | 370/431 |
| 2004/0109447 A1* | 6/2004 | Douglass | ............ | H04L 49/602 |
| | | | | 370/389 |
| 2007/0291649 A1 | 12/2007 | Nabae | | |
| 2012/0257529 A1* | 10/2012 | Ehara | ................ | H04L 12/66 |
| | | | | 370/252 |
| 2012/0287785 A1* | 11/2012 | Kamble | ............ | H04L 49/356 |
| | | | | 370/230.1 |
| 2014/0325649 A1* | 10/2014 | Zhang | ............... | H04L 43/024 |
| | | | | 726/23 |
| 2014/0365680 A1* | 12/2014 | van Bemmel | ........ | H04L 29/06 |
| | | | | 709/232 |

FOREIGN PATENT DOCUMENTS

| | | |
|---|---|---|
| JP | 2011-160363 | 8/2011 |
| WO | 2006/098043 A1 | 9/2006 |

* cited by examiner

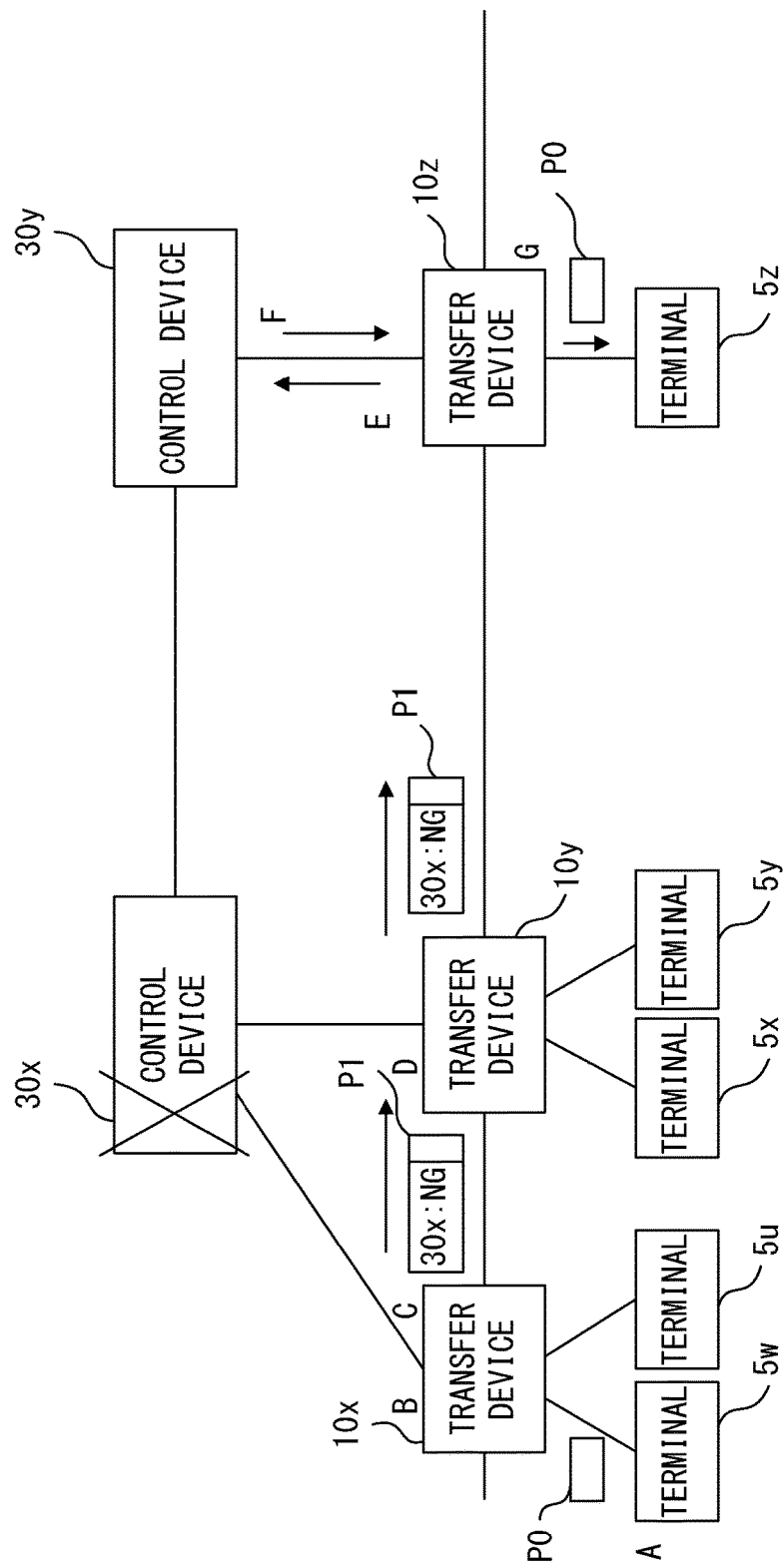
F I G. 1

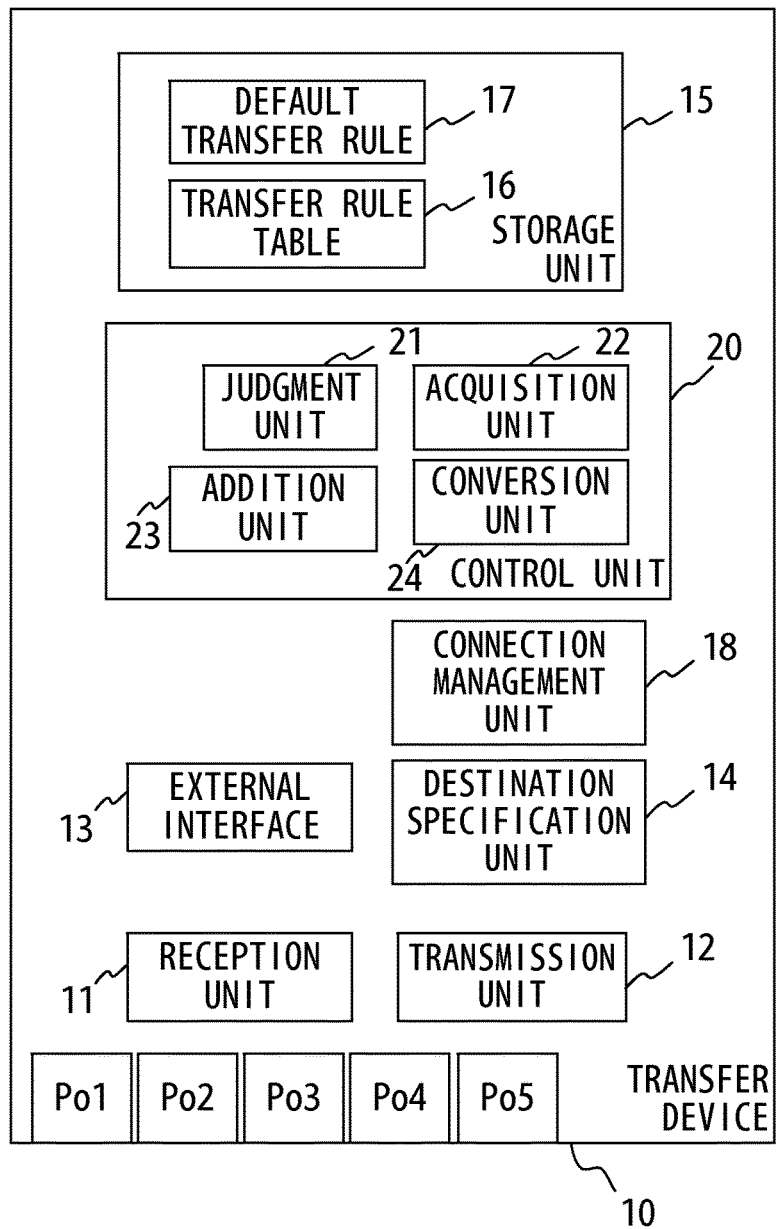
F I G. 2

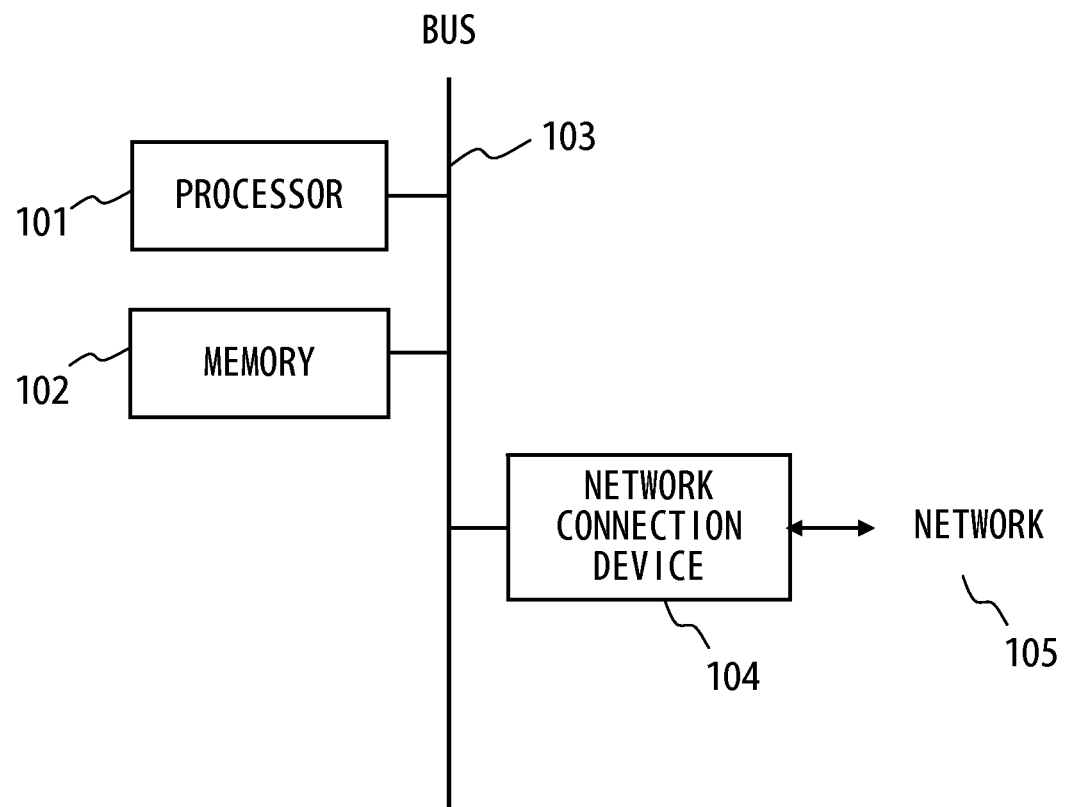
F I G. 5

| PRIORITY | DESTINATION MAC ADDRESS | ACTION |
|---|---|---|
| 1 | TERMINAL 5a | OUTPUT FROM PORT Po 4 |
| 2 | TERMINAL 5b | OUTPUT FROM PORT Po 2 |

16a

| PRIORITY | DESTINATION MAC ADDRESS | OCCURRENCE OF FAULT | ACTION |
|---|---|---|---|
| 3 | any | yes | OUTPUT FROM PORT Po 3 |

17a

| PRIORITY | DESTINATION MAC ADDRESS | ACTION |
|---|---|---|
| 1 | TERMINAL 5a | OUTPUT FROM PORT Po 4 |
| 2 | TERMINAL 5b | OUTPUT FROM PORT Po 4 |
| 3 | TERMINAL 5c | OUTPUT FROM PORT Po 3 |

16b

| PRIORITY | DESTINATION MAC ADDRESS | OCCURRENCE OF FAULT | ACTION |
|---|---|---|---|
| 4 | any | yes | OUTPUT FROM PORT Po 2 |

17b

| PRIORITY | DESTINATION MAC ADDRESS | OCCURRENCE OF FAULT | ACTION |
|---|---|---|---|
| 1 | any | yes | OUTPUT FROM PORT Po 3 |

17c

| PRIORITY | DESTINATION MAC ADDRESS | OCCURRENCE OF FAULT | ACTION |
|---|---|---|---|
| 1 | any | yes | OUTPUT FROM PORT Po 4 |

17d

F I G. 7

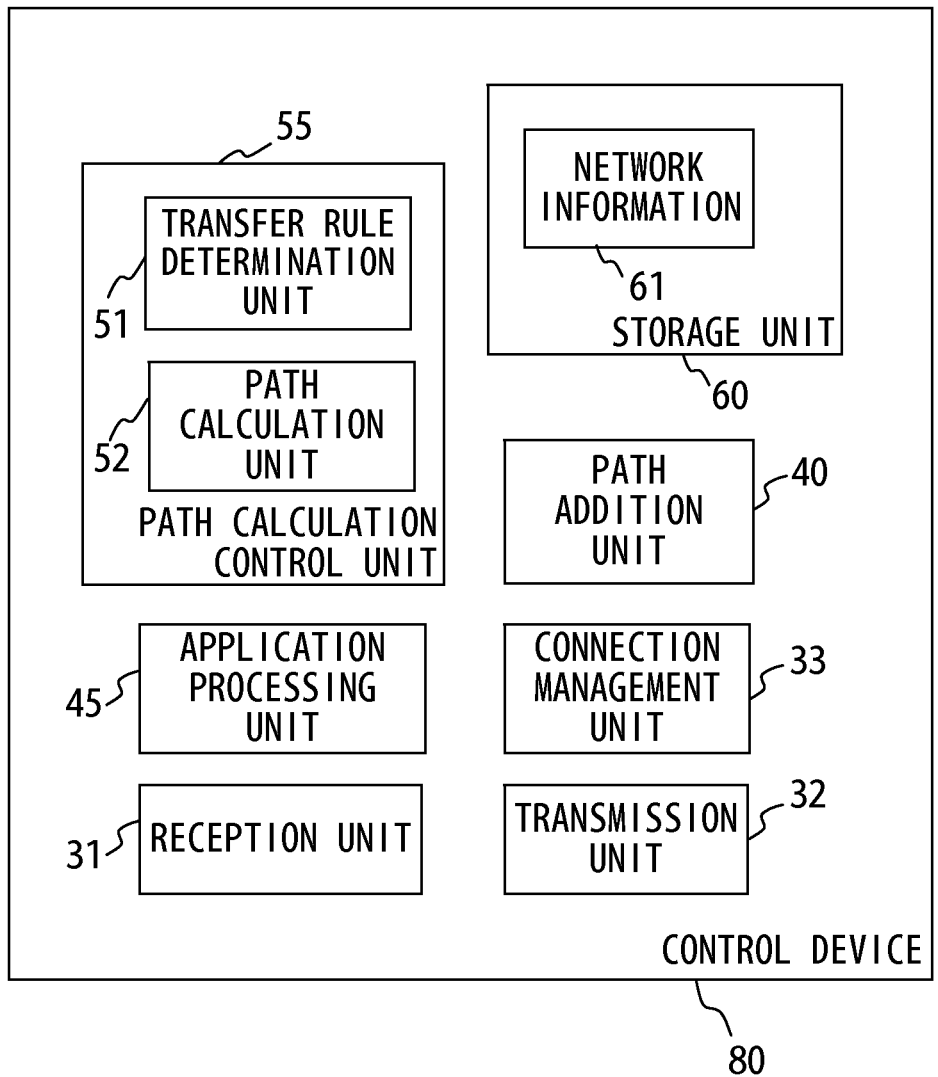
F I G. 1 2

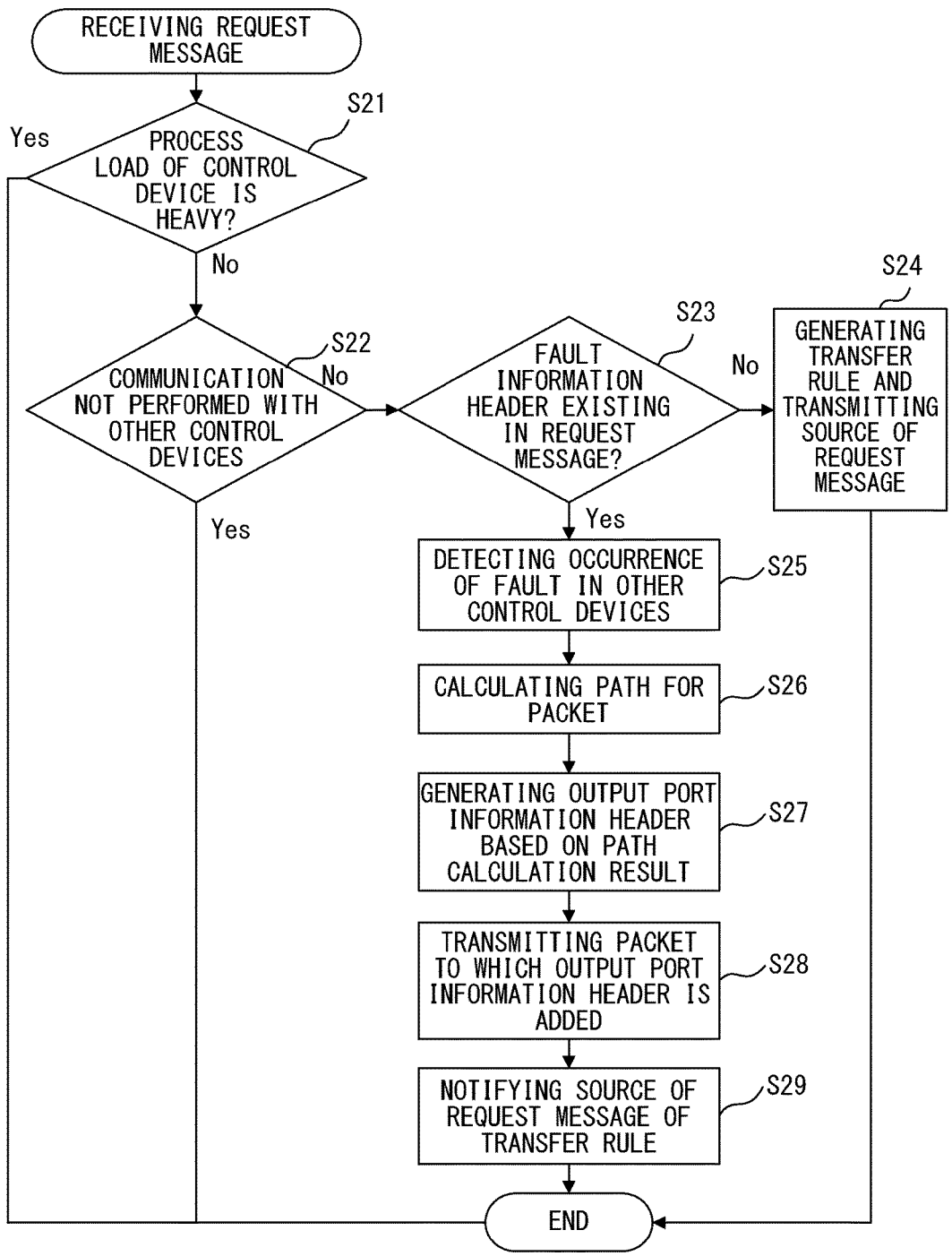
F I G. 1 5

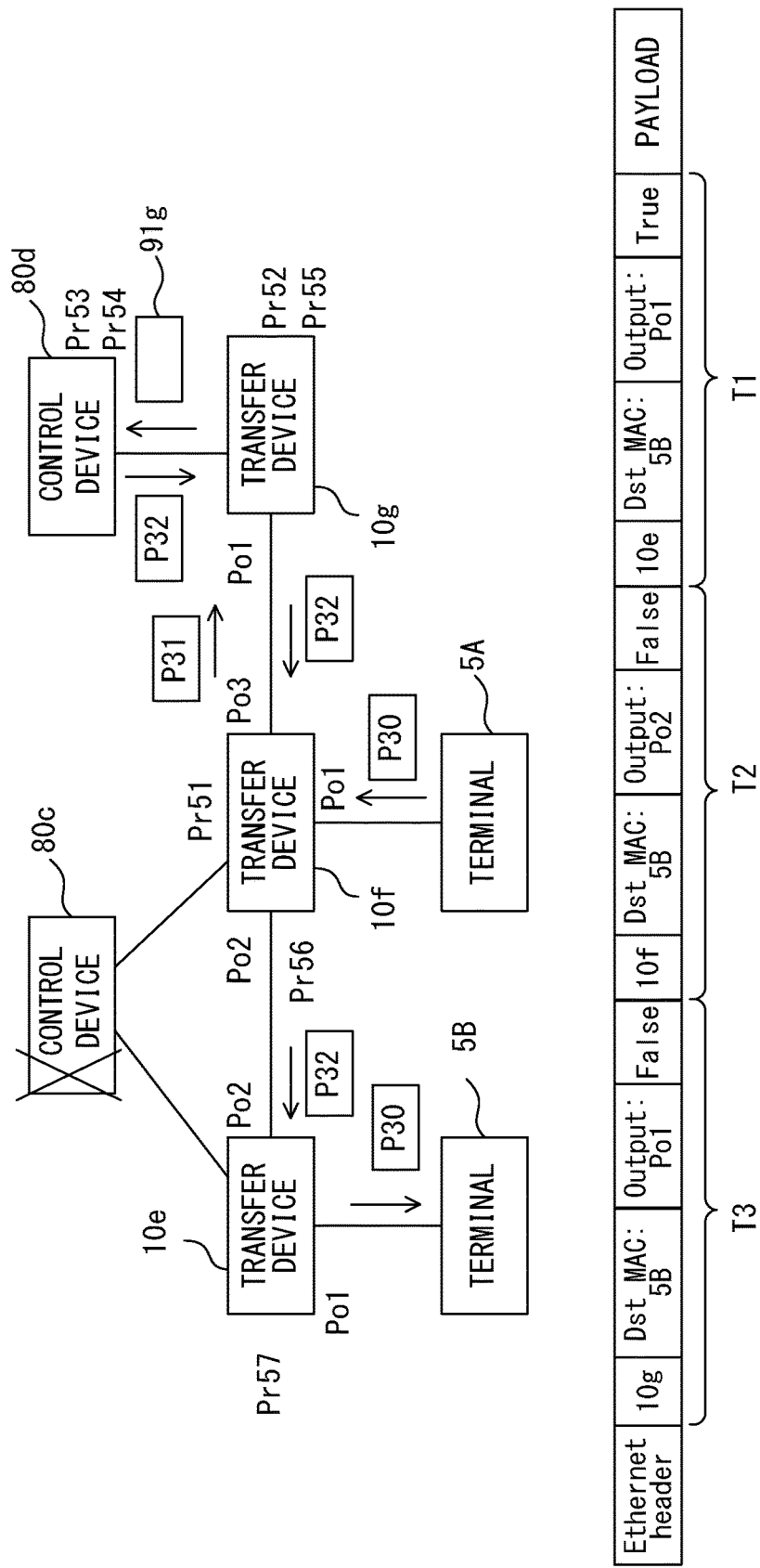
F I G. 18

| 16e_1 | |
|---|---|
| CONDITION | ACTION |
| Dst MAC:5A | Output Po2 |

| 16f_1 | |
|---|---|
| CONDITION | ACTION |
| Dst MAC:5A | Output Po1 |

| 16g_1 | |
|---|---|
| CONDITION | ACTION |
| Dst MAC:5A | Output Po1 |

→

| 16e_2 | |
|---|---|
| CONDITION | ACTION |
| Dst MAC:5A | Output Po2 |
| Dst MAC:5B | Output Po1 |

| 16f_2 | |
|---|---|
| CONDITION | ACTION |
| Dst MAC:5A | Output Po1 |
| Dst MAC:5B | Output Po2 |

| 16g_2 | |
|---|---|
| CONDITION | ACTION |
| Dst MAC:5A | Output Po1 |
| Dst MAC:5B | Output Po1 |

F I G. 19

TRANSFER DEVICE, CONTROL DEVICE, AND TRANSFER METHOD

CROSS-REFERENCE TO RELATED APPLICATION

This application is based upon and claims the benefit of priority of the prior Japanese Patent Application No. 2013-219657, filed on Oct. 22, 2013, the entire contents of which are incorporated herein by reference.

FIELD

The embodiments discussed herein are related to a method of transferring a packet in a network including a plurality of devices.

BACKGROUND

Recently, a virtual network using software and software defined networking (SDN), which is the technology of forming a virtual network, have attracted attention. In the SDN, a device called a controller manages a device included in a network. For example, a switch in the network transfers a received packet using a transfer rule acquired from the controller. When a packet which is not to be processed using a transfer rule is received, the switch notifies the controller of the information about the received packet, thereby acquiring from the controller the information for specification of the method of processing the packet. The switch performs the process of transferring the packet based on the information acquired from the controller. Thus, since the controller has an influence on the process performed by another device, it is designed to provide a plurality of controllers throughout a network to improve the fault tolerance and the extensibility of a system.

Designed as a related technology is a system including a plurality of controllers which calculate relative communication paths and a plurality of switches which relay a received packet through the path set by a path determiner in the plurality of controllers.

For example, a document such as Japanese Laid-open Patent Publication No. 2011-160363 etc. is well known.

There is a case in which a notification according to a transfer rule is not to be transmitted from a controller to a switch when a certain controller becomes faulty or when an excess load is applied to a certain controller although a plurality of controllers are included in a network. Even in such a case, a switch incapable of processing a received packet requests a controller to which the switch is connected for the information used in transferring the packet (that is, a transfer rule). In this case, since the switch requests the controller to transmit the transfer rule although the switch is not to acquire the transfer rule, the wasteful communicating process is performed, thereby decreasing efficiency.

SUMMARY

According to an aspect of the embodiments, a transfer device in a network including a plurality of control devices includes a network connection device, memory, and a processor. The network connection device transmits and receives a target packet in a transferring process. The memory stores a transfer rule which indicates a method of a process performed by the transfer device and is received by the network connection device from a determination device as a control device which determines the transfer rule. When the transfer rule which may be applied to the target packet is not stored in the memory, the processor judges whether or not disable information indicating that the transfer rule is not to be acquired from the determination device is included in the target packet. When the disable information is included, the processor does not request the determination device to transmit the transfer rule which is applied to the target packet, but outputs the target packet to the network connection device. The network connection device transmits the target packet to another transfer device.

The object and advantages of the invention will be realized and attained by means of the elements and combinations particularly pointed out in the claims.

It is to be understood that both the foregoing general description and the following detailed description are exemplary and explanatory and are restrictive of the invention.

BRIEF DESCRIPTION OF DRAWINGS

FIG. 1 is an example of a communicating method according to an embodiment;

FIG. 2 is an example of a configuration of a transfer device;

FIG. 5 is an example of a hardware configuration of the transfer device and the control device;

FIG. 7 is an example of a transfer rule table and a default transfer rule;

FIG. 12 is an example of the configuration of the control device used in the second embodiment;

FIG. 15 is a flowchart for explanation of an example of an operation of the control device;

FIG. 18 is an explanatory view of an example of a processing method according to a transfer rule;

FIG. 19 is an explanatory view of an example of a variation of a transfer rule table;

DESCRIPTION OF EMBODIMENTS

Figure 3:
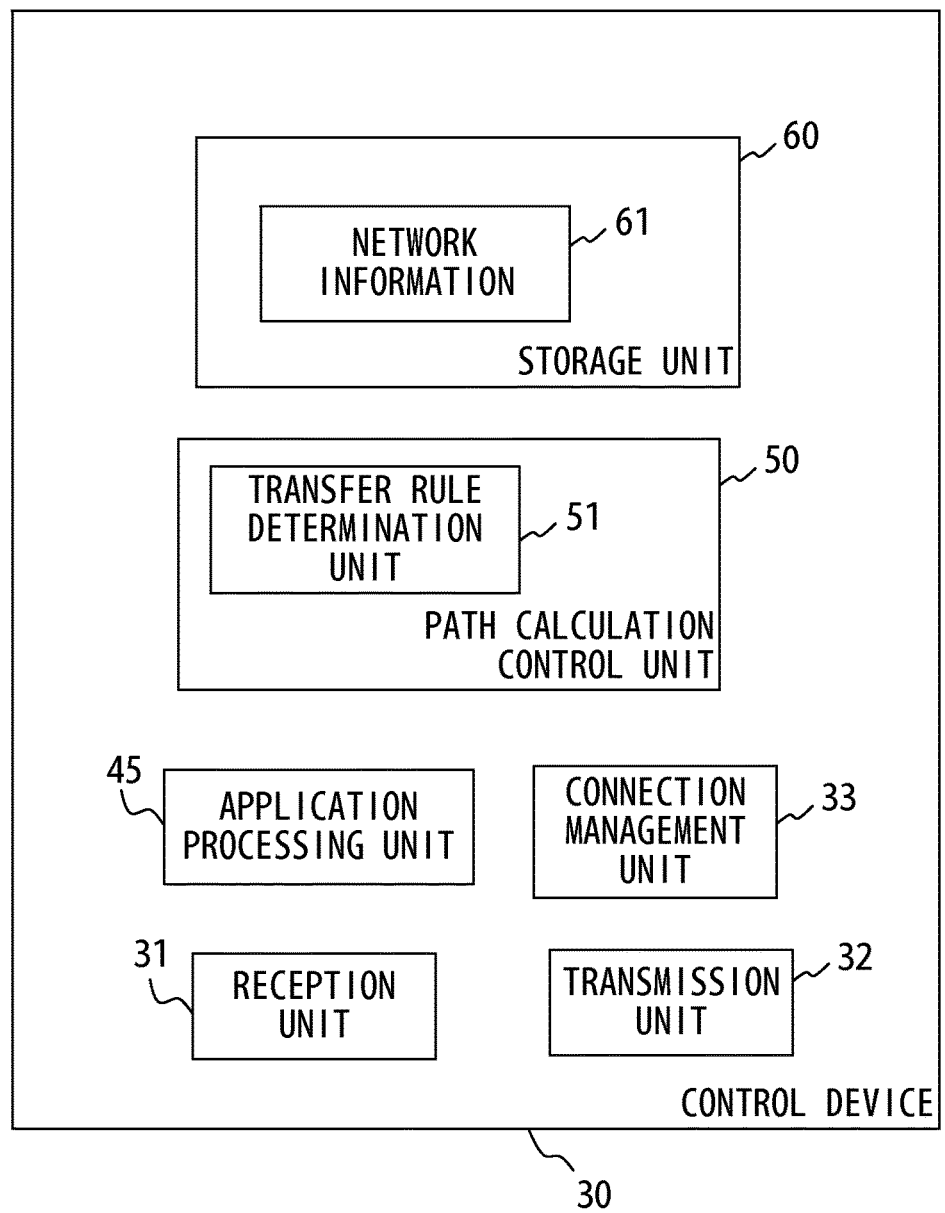
FIG. 3 is an example of a configuration of a control device.

FIG. 1 is an example of a communicating method according to an embodiment. The network illustrated in FIG. 1 includes a plurality of transfer devices 10 (10x through 10z)

and a plurality of control devices 30 (30x and 30y). It is assumed that the control device 30 may function as a controller in the SDN, determine the transfer path of a packet, and notify of a transfer rule. The transfer device 10x and the transfer device 10y are connected to the control device 30x. The transfer device 10z is connected to the control device 30y. The transfer device may function as a switch in the SDN, and transfers a packet according to the information (transfer rule) obtained from the control device. Terminals 5w and 5u are connected to the transfer device 10x, and terminals 5x and 5y are connected to the transfer device 10y. Furthermore, a terminal 5z is connected to the transfer device 10z.

The transfer rule refers to optional data indicating the method of a transferring process. For example, the transfer rule may be the information in which the number of an output port to be used when the transfer device 10 transfers a packet is associated with the destination media access control (MAC) address. Upon receipt of a packet not to be transferred using the transfer rule notified by the control device 30x, the transfer device 10x requests the control device 30x to transmit a new transfer rule, and performs the transferring process on the packet using the obtained transfer rule. The transfer device 10y also performs a process similar to that performed by the transfer device 10x. Furthermore, the transfer device 10z acquires the transfer rule from the control device 30y and performs a transferring process on a packet. In the example illustrated in FIG. 1, the transfer devices 10x and 10y transfer the packet using the transfer rule acquired from the control device 30x. However, when the control device 30x becomes faulty, a connection is made with the control device 30y, and transfer rule is acquired from the control device 30y.

Described below is the communicating method according to an embodiment with reference to an example in which the terminal 5w transmits a packet P0 addressed to the terminal 5z before the transfer devices 10x and 10y establish a communication with the control device 30y after the 30x becomes faulty. In this example, it is assumed that any of the transfer devices 10x through 10z has not held the transfer rule of the packet addressed to the terminal 5z.

In procedure A, the terminal 5w generates a packet P0 addressed to the terminal 5z, and transmits the packet toward the terminal 5z. Accordingly, the packet P0 is transmitted to the transfer device 10x.

In procedure B, upon receipt of the packet P0, the transfer device 10x judges whether or not the packet P0 may be transferred using the transfer rule stored in advance. In this example, the transfer device 10x judges that the packet P0 is not to be transferred using the stored transfer rule.

Described below is procedure C. Since the transfer device 10x has not established a connection with the control device 30y, the transfer device 10x is to inquire the transfer rule from the control device 30x. Then, the transfer device 10x requests the transfer rule from the control device 30x. However, since the control device 30x has become faulty, the transfer device 10x is unable to acquire the transfer rule.

When the transfer rule is not acquired from the control device 30x in a specified time, the transfer device 10x adds to the packet P0 the information that the transfer rule is not to be acquired from the control device 30x, thereby converting the packet P0 into a packet P1. The information used to notify that a transfer rule is not to be acquired from a control device may be hereafter referred to as disable information. The disable information includes an identifier for identification of the control device 30 which is unable to notify of a transfer rule. In the example illustrated in FIG. 1, the disable information is 30x:NG in the packet P1. The transfer device 10x transfers the packet P1 to another transfer device 10 connected to the transfer device 10x. The method of selecting the destination of the packet P1 is described later. In this example, it is assumed that the packet P1 is transmitted to the transfer device 10y.

Described below is procedure D. The transfer device 10y first judges whether or not the packet P1 may be transferred using the stored transfer rule. In this example, the transfer device 10y judges that the packet P1 is not to be transferred using the stored transfer rule. Next, the transfer device 10y extracts the disable information in the packet P1. The disable information in the packet P1 indicates that no transfer rule is acquired from the control device 30x. Then, the transfer device 10y does not request the control device 30x to transmit a transfer rule, but transfers the packet P1 to the transfer device 10z. It is assumed that, like the transfer device 10x, the transfer device 10y selects a transfer device which transfers the packet P1 in the method described later.

Described below is procedure E. Like the transfer device 10y, the transfer device 10z judges that the packet P1 is not to be transferred using the stored transfer rule. Next, the transfer device 10z extracts the disable information in the packet P1 to judge whether or not a transfer rule may be acquired from the control device 30y. The disable information about the packet P1 indicates that no transfer rule is acquired from the control device 30x, but does not refer to the information about the control device 30y. Therefore, the transfer device 10z requests the control device 30y to transmit a transfer rule.

In procedure F, the control device 30y transmits to the transfer device 10z the transfer rule including the destination of the packet addressed to the terminal 5z at the request from the transfer device 10z.

Described below is procedure G. The transfer device 10z specifies the destination of the packet P1 using the transfer rule. Furthermore, according to the transfer rule, the transfer device 10z recognizes that a packet may be transmitted directly to the terminal 5z from the transfer device 10z. Then, the transfer device 10z transmits the packet P0 to the terminal 5z after converting the packet P1 into the packet P0 by deleting the disable information from the packet P1. The terminal 5z receives the packet P0 from the transfer device 10z.

Thus, according to the communicating method of the embodiment, when the transfer device 10 is notified of the control device 30 which is unable to acquire a transfer rule by another transfer device 10, the notified transfer device 10 does not request the control device 30 to transmit a transfer rule. Therefore, the transfer device 10 may avoid performing a wasteful inquiring process on the control device 30. Furthermore, when the destination is not specified due to the absence of a transfer rule, the transfer device 10 transfers a target packet to another transfer device 10. Then, although the transfer device 10 is unable to acquire a transfer rule while changing the control device 30 to be requested for a transfer rule, the transfer device 10 does not discard a packet, thereby preventing a packet loss in the transfer device 10.

The case in which the control device 30x has become faulty is described above with reference to FIG. 1, but the communicating method according to the embodiment may be applied to the case in which a transfer rule is not acquired from the control device 30x. For example, the process similar to that illustrated in FIG. 1 may be performed in the case in which no processing is performed due to the heavy load of the control device 30x. On the other hand, when the control device 30x is disconnected from the transfer device 10x, the transfer device 10x is unable to acquire a transfer rule, but the transfer device 10y may acquire a transfer rule from the control device 30x. Thus, when any transfer device 10 other than the transfer device 10x may acquire a transfer rule, the transfer device 10x does not add disable information to a packet. Therefore, although the connection of the transfer device 10x is disabled, the transfer device 10y may acquire a transfer rule.

FIG. 1 is an example of a communication in a network. For example, the number of transfer devices 10 connected to the control device 30 and the number of terminals 5 connected to the transfer device 10 may be arbitrarily changed. The network illustrated in FIG. 1 may be a logical network, and the network may be realized by one computer or a plurality of computers connected through a physical circuit. Furthermore, it is assumed that the logical network may be realized by any technique such as OpenFlow according to which the transfer device 10 transfers a packet using the transfer rule determined by the control device 30. In the present specification, for convenience of readability, the term used in representing the unit of information communicated in a network is uniformed as a "packet". Therefore, depending on the implementation, the term "packet" may be read as a "frame" appropriately.

<Configuration of Device>

FIG. 2 is an example of a configuration of the transfer device 10. The transfer device 10 includes a reception unit 11, a transmission unit 12, a destination specification unit 14, a storage unit 15, a connection management unit 18, a control unit 20, and ports Po 1 through Po 5. Furthermore, the transfer device 10 may include an external interface 13. The control unit 20 includes a judgment unit 21, an acquisition unit 22, an addition unit 23, and a conversion unit 24. FIG. 2 is an example of the transfer device 10 which includes five ports, but the number of ports of one transfer device 10 may be varied depending on the implementation.

The reception unit 11 receives a packet from another transfer device 10, the control device 30, the terminal 5, etc via any of ports Po 1 through Po 5. The transmission unit 12 transmits a packet to another transfer device 10, the control device 30, the terminal 5, etc. For example, the transmission unit 12 transmits the packet input from the addition unit 23, the conversion unit 24, etc.

The destination specification unit 14 determines the port as the output destination of the packet received by the reception unit 11. The destination specification unit 14 specifies an applicable transfer rule using as a key the condition of the destination etc. of the packet. When an applicable transfer rule is specified, the destination specification unit 14 determines the port which outputs the packet based on the transfer rule, and outputs the packet to be transferred to the conversion unit 24 with a port number. On the other hand, when an applicable transfer rule is not specified, the destination specification unit 14 outputs the packet to the judgment unit 21.

The storage unit 15 holds a transfer rule table 16. The transfer rule table 16 records the transfer rules which have been acquired by the transfer device 10. The storage unit 15 also holds a default transfer rule 17. Hereafter, it is assumed that the default transfer rule 17 indicates the information for specification of the destination of a packet which is not to be processed using the transfer rule table 16. The default transfer rule 17 may be generated by the control device 30, or may be determined by a device or an operator not included in the network. When the default transfer rule 17 is determined by the device or the operator not included in the network, the transfer device 10 acquires the default transfer rule 17 through the external interface 13. On the other hand, when the control device 30 generates the default transfer rule 17, the transfer device 10 acquires the default transfer rule 17 through the reception unit 11. The examples of the transfer rule table 16 and the default transfer rule 17 are described later. Furthermore, the storage unit 15 also holds the data to be used in the process by the control unit 20 and the data generated in the process by the control unit 20.

The connection management unit 18 monitors the state of the session between the transfer device 10 and the control device 30, the session used in the communication between the transfer devices 10, and the session between the transfer device 10 and the terminal 5. For example, when the session between the connection management unit 18 and the control device 30a is disconnected, the connection management unit 18 also performs the processes for re-establishment of the session with the control device 30a and the establishment of the session with another control device 30b. The connection management unit 18 notifies the acquisition unit 22 of the control device 30 which has succeeded in establishing a session and to which the request for a transfer rule is transmitted. For example, the connection management unit 18 may notify the acquisition unit 22 of the identifier of the session which has been established with the device to which the request for a transfer rule is transmitted, and the identifier of the control device 30 to which the request for a transfer rule is transmitted.

The judgment unit 21 judges whether or not the disable information is included in the packet input from the destination specification unit 14. The disable information includes the identifier of the control device 30 which is unable to acquire a transfer rule. If the disable information is included in the packet, the judgment unit 21 judges whether or not the identifier of the control device 30 to which the request for a transfer rule is transmitted is included in the disable information. If the identifier of the device to which the request for a transfer rule is transmitted is included in the disable information, then the judgment unit 21 determines that a request for a transfer rule is not transmitted to the control device 30. When a transfer rule is not requested, the judgment unit 21 outputs the packet input from the destination specification unit 14 to the addition unit 23.

On the other hand, when the identifier of the device of which a transfer rule is inquired is not included in the disable information, the judgment unit 21 outputs the packet to be processed to the acquisition unit 22. Also when the disable information is not included in the packet input from the destination specification unit 14, the judgment unit 21 outputs the packet to the acquisition unit 22.

The acquisition unit 22 generates a message as a request to the control device 30 for a transfer rule, and outputs the message to the transmission unit 12. In this case, the acquisition unit 22 includes in the message address to the control device 30 the information about the destination of the packet, the information as to whether or not the disable information is included in the packet. Hereafter, the message used in requesting a transfer rule to the control device 30 may be described as a "request message". Furthermore, the acquisition unit 22 may include in the request message the packet as the trigger of the request for a transfer rule. The acquisition unit 22 stores the time at which the request message is transmitted to the control device 30. If a transfer rule is not obtained after the elapsed time from the time at which the request message has been transmitted exceeds a threshold stored in advance, then the acquisition unit 22 judges that a transfer rule is not acquired from the control device 30 which is communicating with the acquisition unit 22. Then, the acquisition unit 22 outputs to the addition unit 23 the packet as the trigger of the process of requesting a transfer rule.

The addition unit 23 adds disable information to the input packet. The disable information includes the identifier of the destination control device 30 (to which the request is transmitted) when the transfer device 10 to which the disable information is added fails in the acquisition of a transfer rule. After the addition of the disable information, the addition unit 23 specifies the output port of the packet using the default transfer rule 17, and outputs the processed packet to the transmission unit 12. The details of the disable information and the operation of the addition unit 23 are described later.

When the time from the transmission time of the request message to the reception of the transfer rule is less than or equal to the threshold, the acquisition unit 22 outputs to the conversion unit 24 the packet as the trigger of the process of requesting the transfer rule. The conversion unit 24 deletes the disable information included in the packet through which the transfer rule has been acquired, thereby converting he packet input from the acquisition unit 22 into a packet (transfer packet) to be processed by the terminal 5. If disable information is included in a packet input from the destination specification unit 14, the conversion unit 24 outputs to the transmission unit 12 the packet from which the disable information has been deleted with a port number notified from the destination specification unit 14.

FIG. 3 is an example of a configuration of the control device 30. The control device 30 includes a reception unit 31, a transmission unit 32, a connection management unit 33, an application processing unit 45, a path calculation control unit 50, and a storage unit 60. The path calculation control unit 50 includes a transfer rule determination unit 51.

The reception unit 31 receives a packet from the transfer device 10, another control device 30, etc. The reception unit 31 outputs to the transfer rule determination unit 51 a packet including the information indicating the request message of a transfer rule. The reception unit 31 outputs to the application processing unit 45 a packet other than the request message. As the information indicating the request message, for example, an OpenFlow header etc. indicating a Packet-In message is used. The transmission unit 32 transmits a packet to the transfer device 10, another control device 30, etc. For example, the 32 transmits the packet input from the transfer rule determination unit 51 etc.

The connection management unit 33 monitors the state of the session between the transfer device 10 and the control device 30, and the session used in sharing data among the control devices 30. Upon request from the transfer device 10 for the establishment of a session, the connection management unit 33 appropriately performs the process for establishing a session with the transfer device 10.

The transfer rule determination unit 51 determines a transfer rule using topology information indicating the topology of a network. The transfer rule determination unit 51 generates a reply message including a transfer rule. The destination of the reply message is the transfer device 10 as the source of the request message. The transfer rule determination unit 51 outputs a reply message to the transmission unit 32. Furthermore, the transfer rule determination unit 51 judges that the load is heavy when the number of request messages received per unit time exceeds a threshold stored in advance. When the transfer rule determination unit 51 judges that the load is heavy, the transfer rule determination unit 51 may generate a stop message for stopping a new inquiry, and may transmit it to the connected transfer device 10.

The storage unit 60 holds data such as network information 61 etc. The network information 61 includes the topology information about a network, the port number used by the 10 for each connection, etc. Furthermore, the storage unit 60 also holds data used in the processes by the application processing unit 45 and the path calculation control unit 50, and data generated in these processes.

Figure 4:
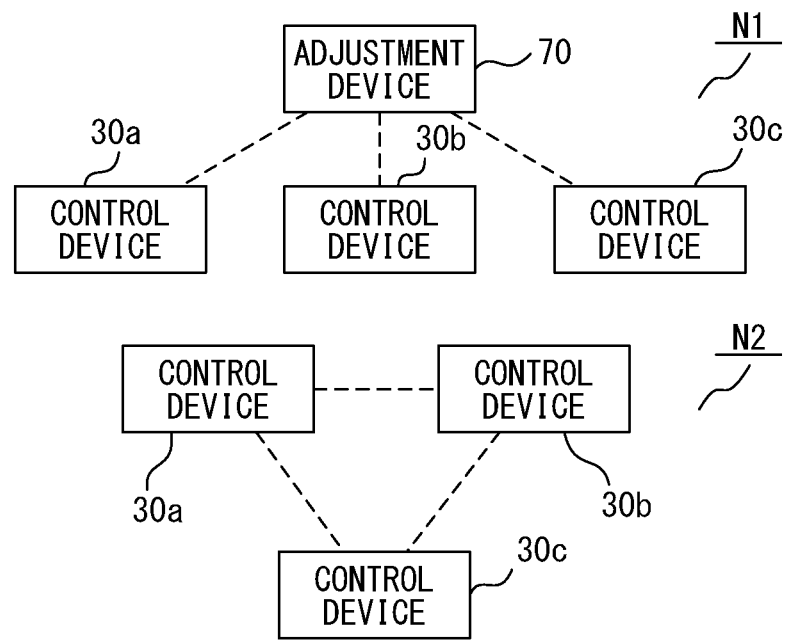
FIG. 4 is an explanatory view of an example of a communicating method of the control device.

Each control device 30 shares the information about another control device 30 in the network, and the information about the transfer device 10 and the terminal 5 connected to another control device 30. To share the information among the control devices 30, network N1 or N2 illustrated in FIG. 4 is used. FIG. 4 is an example of the case in which three control devices 30 (30a through 30c) are used, and the number of control devices 30 may be arbitrarily changed.

In the network N1, each of the control devices 30a through 30c is connected to an adjustment device 70. The control device 30a periodically notifies the adjustment device 70 of the identifier of the transfer device 10 connected to the control device 30a and the information about the terminal 5 connected through the transfer device 10. The control devices 30b and 30c also notify the adjustment device 70 of the information about the connected transfer device 10 and the terminal 5. The adjustment device 70 stores the information indicating the connection relationship to the transfer device 10 and the connection relationship to the terminal 5 for each control device 30. Furthermore, the adjustment device 70 monitors whether or not each of the control devices 30a through 30c normally operates. The control devices 30a through 30c appropriately acquire data from the adjustment device 70, and store the obtained data in the storage unit 60.

On the other hand, when the network N2 is used, the control devices 30a through 30c communicate the information indicating the connection relationship with one another. The control devices 30a through 30c also perform a process of confirming whether or not they normally operate with one another. For example, in the network N2, the control device 30a notifies the control device 30b of the information indicating the connection relationship held by the control device 30a, and judges whether or not the control device 30a may normally communicate with the control device 30b. Furthermore, the control device 30a also notifies the control device 30b of the information indicating the connection relationship notified from the control device 30c to the control device 30a. The control device 30b also exchanges the information indicating the connection relationship with the control device 30c and monitors whether or not the normal operation is being performed. In this case, the control device 30b also notifies the transfer device 10c of the information indicating the connection relationship obtained from the transfer device 10a in addition to the information about the transfer device 10 and the terminal 5 connected to the control device 30b. The transfer device 10c exchanges the information indicating the connection relationship with the control device 30a and monitors whether or not the normal operation is being performed. The control device 30c also notifies the transfer device 10a of the information indicating the connection relationship obtained from the transfer device 10b in addition to the information about the transfer device 10 and the terminal 5 connected to the control device 30c. Thus, when the network N2 is used, the information indicating the connection relationship may be shared among all control devices 30 by the communication among the control devices 30a through 30c.

FIG. 5 is an example of a hardware configuration of the transfer device 10 and the control device 30. When the adjustment device 70 is provided in the network, the hardware configuration of the adjustment device 70 is the same as the configuration illustrated in FIG. 5. Both the transfer device 10 and the control device 30 include a processor 101, memory 102, a bus 103, and a network connection device 104. The bus 103 connects the processor 101, the memory 102, and the network connection device 104 so that they may communicate data with one another. In the transfer device 10, the processor 101 realizes the destination specification unit 14, the connection management unit 18, and the control unit 20. The memory 102 operates as, for example, the storage unit 15. The network connection device 104 realizes the reception unit 11 and the transmission unit 12, and includes also a port. The network connection device 104 communicates with a network 105.

In the control device 30, the processor 101 realizes the connection management unit 33, the application processing unit 45, and the path calculation control unit 50. The memory 102 operates as, for example, the storage unit 60. The network connection device 104 realizes the reception unit 31 and the transmission unit 32. The adjustment device 70 holds the information acquired from the control device 30 in the memory 102. Furthermore, the adjustment device 70 communicates with the control device 30 using the network connection device 104. In the adjustment device 70, the processor 101 updates the data stored in the memory 102 and controls the communication with the control device 30.

First Embodiment

Figure 6:
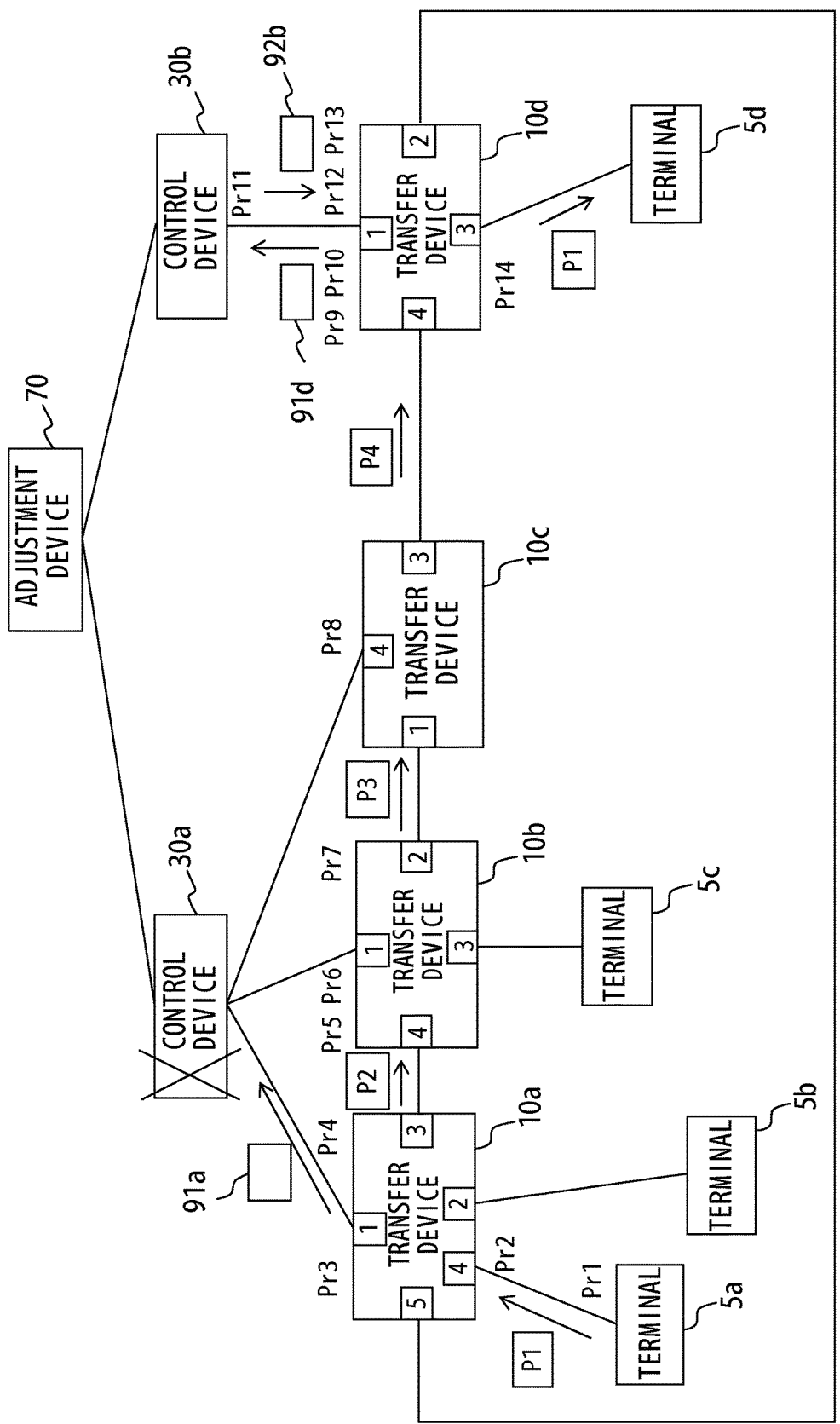
FIG. 6 is an example of a network.

FIG. 6 is an example of a network. FIG. 6 is an example of a logical network, and the solid line in FIG. 6 indicates that a session is established. Furthermore, one or more devices illustrated in FIG. 6 may be implemented by one physical computer.

In the example illustrated in FIG. 6, the control devices 30a and 30b are connected to the adjustment device 70. The control device 30a is connected to the transfer devices 10a through 10c, and the control device 30b is connected to the transfer device 10d. In the example illustrated in FIG. 6, the transfer devices 10a through 10d are circularly connected in the order of the transfer devices 10a, 10b, 10c, and 10d. Furthermore, an optional number of terminals 5 are connected to each transfer device 10. In FIG. 6, for visibility of the drawing, only a part of the terminals 5 are illustrated. In the example in FIG. 6, the transfer devices 10a through 10c transfer a packet using the transfer rule acquired from the control device 30a, and the transfer device 10d transfers a packet using the transfer rule acquired from the control device 30b. The square including a numeral in each transfer device 10 indicates a port, and the numeral written in the square indicates a port number.

FIG. 7 is an example of the transfer rule table 16 and the default transfer rule 17. The transfer rule table 16a in FIG. 7 is an example of the transfer rule table 16 held by the transfer device 10a. The transfer rule is any rule which associates the condition of a packet input to the transfer device 10 with the process on the packet. Each rule is assigned a priority, and a rule assigned a higher priority (having a smaller priority value) is applied by priority. The item for specification of the condition of a packet may be the information about any layer included in the packet. For example, a transfer rule may include the condition of a physical layer such as an input port of a switch, and the information about a transport layer such as a destination TCP port number etc. The action indicates the process of the transfer device 10 associated with the combination of conditions.

For example, when the destination MAC address is the address of the terminal 5a, the transfer device 10a outputs a packet to be processed from the port Po 4 using the rule of the priority of 1 in the transfer rule table 16a. Similarly, when the destination MAC address is an address of the terminal 5b, the transfer device 10a outputs the packet to be processed from the port Po 2 using the rule of the priority of 2 in the transfer rule table 16a.

On the other hand, when the transfer device 10 is unable of applying the transfer rule included in the transfer rule table 16, and is unable of acquiring a further new transfer rule, it performs a transferring process using the default transfer rule 17. For example, since the transfer device 10a holds the transfer rule table 16a, it does not hold the transfer rule on the packet address to the terminal 5c. Therefore, the acquisition unit 22a of the transfer device 10a requests the control device 30a to transmit a transfer rule for application to a packet addressed to the terminal 5c, but may be unable to acquire the transfer rule due to the occurrence of a fault in the control device 30a. Then, the transfer device 10a specifies the output port of the packet after adding the disable information using the default transfer rule 17a illustrated in FIG. 7. In the example in FIG. 7, the transfer device 10a outputs from the port Po 3 the packet after adding the disable information. Furthermore, the default transfer rule 17 may be applied to a packet to which the disable information has been added by another transfer device 10. For example, when the disable information indicating that the transfer rule is not to be acquired from the control device 30a is included in the packet received from another transfer device 10, the transfer device 10a determines an output port according to the default transfer rule 17a.

As described above, FIG. 6 is an example of a logical network. Therefore, at the time point illustrated in FIG. 6, the transfer devices 10a through 10c are connected to the control device 30a. However, if the control device 30a becomes faulty, or if the load of the control device 30a becomes heavy, then the transfer devices 10a through 10c establish a session with the control device 30b. However, until the transfer devices 10a through 10c establish a session with the control device 30b from the time point when the control device 30a is unable to notify of a transfer rule, the transfer devices 10a through 10c are unable to acquire a new transfer rule. Described below is an example of a communicating process performed while the transfer devices 10a through 10c are unable to acquire a new transfer rule.

In the descriptions below, it is assumed that the transfer device 10 adds the information (fault information) for notification that a fault has occurred during the acquisition of a transfer rule when a packet is transferred using the default transfer rule 17. Therefore, in the descriptions below, the disable information may specify that, in the fault information, a transfer rule is not acquired due to the control device 30. The fault information is described later in detail.

[Case 1]

Described below is an example of the process performed when the terminal 5a transmits a packet to the terminal 5d when the control device 30a is faulty in the network in FIG. 6. Assume that none of the transfer devices 10a through 10c recognize that the control device 30a has become faulty. Also assume that the transfer device 10a holds the transfer rule table 16a and the default transfer rule 17a, and the transfer device 10b holds the transfer rule table 16b and the default transfer rule 17b. Furthermore, assume that the transfer device 10c holds the default transfer rule 17c, and the transfer device 10d holds the default transfer rule 17d.

In the descriptions below, for easy discrimination of the device which is performing a process, the alphabetic characters assigned to the transfer device 10 and the control device 30 which are performing operations are described after the respective reference numerals. For example, the judgment unit 21a refers to the judgment unit 21 included in the transfer device 10a. Similarly, for example, the transfer rule determination unit 51a refers to the transfer rule determination unit 51 in the control device 30a.

In procedure Pr 1, the terminal 5a generates the packet P1 addressed to the terminal 5d. The packet P1 is transmitted to the transfer device 10a.

Described below is procedure Pr 2. The reception unit 11a of the transfer device 10a receives the packet P1 addressed to the terminal 5d from the port Po 4. The reception unit 11a outputs the received packet P1 to the destination specification unit 14a. The destination specification unit 14a refers to the transfer rule table 16a, and judges whether or not the port number of the destination of the packet P1 may be acquired. The transfer rule table 16a does not include a transfer rule according to which the destination MAC address is applicable to the packet of the terminal 5d. Therefore, the destination specification unit 14a outputs the packet P1 to the judgment unit 21a.

The judgment unit 21a judges whether or not the fault information is included in the packet P1. In this example, since no fault information is included in the packet P1, the judgment unit 21a outputs the packet P1 to the acquisition unit 22a. The acquisition unit 22a generates a request message 91a including the information about the destination MAC address etc. of the packet P1. The acquisition unit 22a transmits the request message 91a to the control device 30a through the transmission unit 12a, and stores the transmission time of the request message 91a.

Described below is procedure Pr 3. In this example, since the control device 30a becomes faulty, the transfer device 10a is unable to acquire a transfer rule from the control device 30a within a specified time from the transmission time of the request message 91a. Therefore, when the specified time passes from the transmission time of the request message 91a, the acquisition unit 22a outputs the packet P1 to the addition unit 23a. The addition unit 23a adds fault information to the packet P1.

Figure 8:
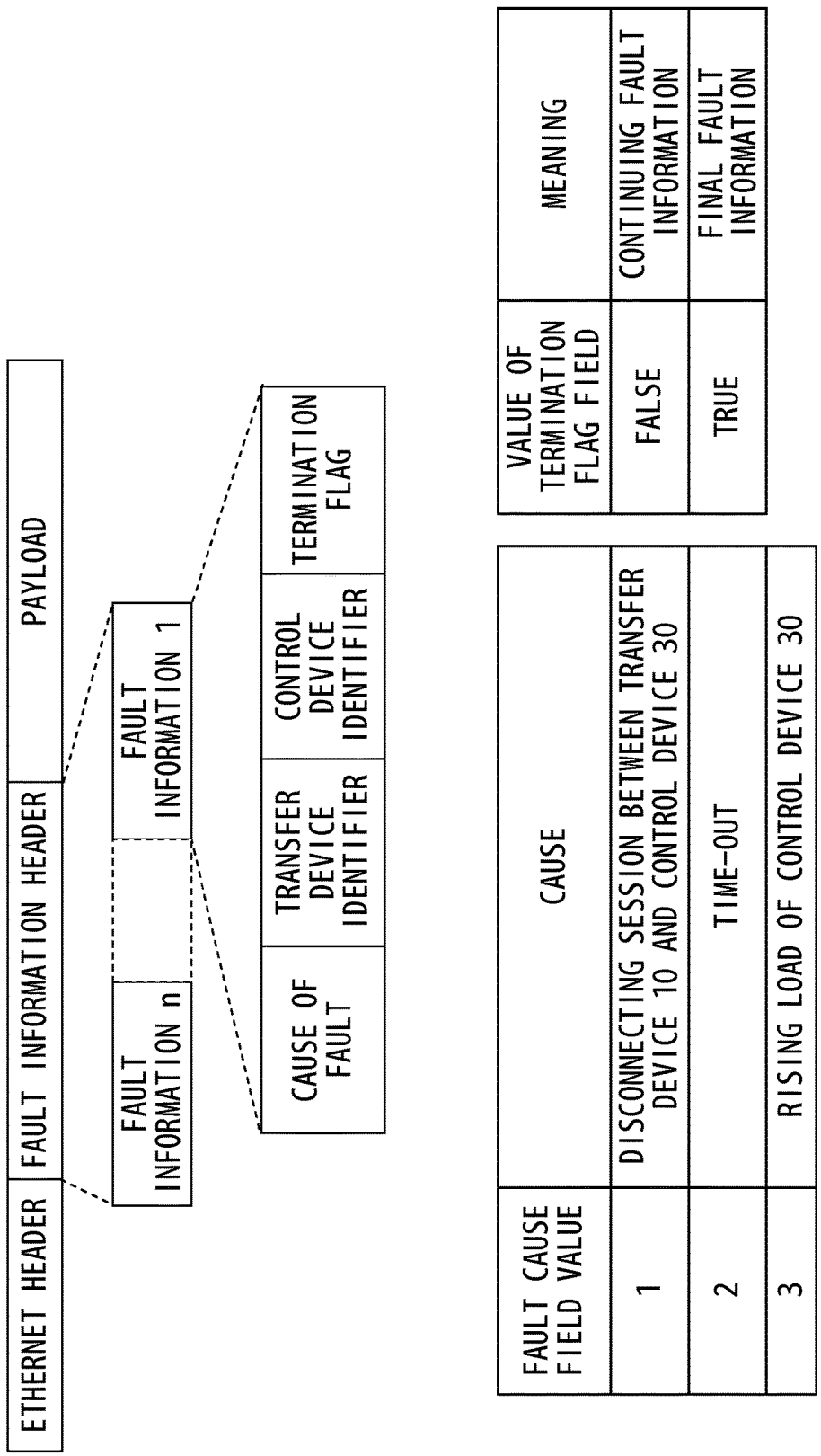
FIG. 8 is an example of a format of a packet including fault information.

FIG. 8 is an example of a format of a packet including fault information. The addition unit 23 adds the fault information between the payload and an Ethernet (registered trademark) header of the packet input from the acquisition unit 22. When the fault information is added to the packet to which the fault information has already been added by another transfer device 10, the addition unit 23 adds new fault information between the fault information on the header side of the packet and the Ethernet header. In the example in FIG. 8, a piece of fault information includes a fault cause, an identifier of the transfer device 10, the identifier of the control device 30, and a termination flag.

A fault cause field stores the value indicating the cause of the fault which has occurred when a transfer rule from the control device 30 is acquired. For example, in the example illustrated in FIG. 8, the fault cause field value of 1 indicates that since the session between the transfer device 10 and the control device 30 has been disconnected, the transfer device 10 is unable to acquire a transfer rule. The fault cause field value of 2 indicates that a transfer rule is not acquired from the control device 30 within a specified time from the transmission of a request message. The fault cause field value of 3 indicates that a transfer rule is not acquired from the control device 30 due to the increase of the load at the control device 30. Therefore, when the fault information illustrated in FIG. 8 is used, the fault information about the fault cause field value of 2 or 3 is disable information. On the other hand, the fault information about the fault cause field value of 1 is not processed as disable information. That is, the fault information about the fault cause field value of 1 indicates that the packet is transferred using the default transfer rule 17, but there is the possibility that the control device 30 is not faulty.

The identifier of the transfer device 10 in the fault information is a value for identification of the transfer device 10 which adds fault information. The identifier of the control device 30 in the fault information is a value for identification of the control device 30 to which a request for a transfer rule is transmitted when a fault occurs when the transfer rule is acquired. A termination flag is used by the device which is performing a process from the head of a packet in specifying the termination of the fault information. The first transfer device 10 to add fault information adds the fault information including a termination flag TRUE, and other transfer devices 10 add fault information including a termination flag FALSE. Therefore, the payload of a packet follows the fault information of the termination flag TRUE.

For example, the addition unit 23a generates the fault information about the termination flag TRUE because the packet P1 includes no fault information header. Furthermore, since a transfer rule is not obtained from the control device 30a within a specified time from the transmission time of the request message 91a, the addition unit 23a sets the fault cause flag to 2. Therefore, the addition unit 23a adds the fault information including the following information to the packet P1.

fault information 1
    fault cause field value: 2
    identifier of transfer device 10: transfer device 10a
    identifier of control device 30: control device 30a
    termination flag: TRUE The packet to which fault information has been added by the addition unit 23a is hereafter referred to as a packet P2. The addition unit 23 specifies the output port of the packet P2 using the default transfer rule 17a (FIG. 7). In the column of the action in the default transfer rule 17a, the output of a packet from the port Po 3 is specified. Then, the addition unit 23a outputs the packet P2 to the transmission unit 12a with the information indicating the port Po 3 as an output port.

In procedure Pr 4, the transmission unit 12a outputs the packet P2 from the port Po 3. Therefore, the packet P2 is transferred to the transfer device 10b.

Described below is procedure Pr 5. The reception unit 11b of the transfer device 10b receives the packet P2 addressed to the terminal 5d from the port Po 4. The reception unit 11b outputs the packet P2 to the destination specification unit 14b. The destination specification unit 14b refers to the transfer rule table 16b (FIG. 7), searches for the port number of the destination of the packet P2, but does not acquire the transfer rule when the destination MAC address is the terminal 5d. Then, the destination specification unit 14b outputs the packet P2 to the judgment unit 21b.

The judgment unit 21b judges whether or not the packet P2 includes a fault information header. Since the fault information header is included in the packet P2 in this example, the judgment unit 21b analyzes the fault information, thereby judging whether or not the disable information has been notified. The judgment unit 21b specifies that the transfer device 10a which is to acquire a transfer rule from the control device 30a has not acquired the transfer rule due to a time-out. Since the time-out of a reply from the control device 30a indicates the occurrence of a fault in the control device 30a, the packet P2 includes the disable information about the control device 30a. Then, the judgment unit 21b judges that a transfer rule is not acquired from the control device 30a. The judgment unit 21b determines not to request a transfer rule because the device to which a request for a transfer rule is transmitted is the control device 30a, and outputs the packet P2 to the addition unit 23b.

Described below is procedure Pr 6. Since the fault cause field value in the fault information including the identifier of the control device 30a is set to 2, the addition unit 23b sets the fault cause field value to 2 in the fault information added by the addition unit 23b. Furthermore, since the fault information is included in the packet P2, the termination flag FALSE is set. Therefore, the addition unit 23b adds the fault information including the following information to the packet P2.
    fault information 2
    fault cause field value: 2
    identifier of transfer device 10: transfer device 10b
    identifier of control device 30: control device 30a
    termination flag: FALSE
The packet to which the addition unit 23b has added the fault information is referred to as a packet P3. The addition unit 23b specifies the output port of the packet P3 using the default transfer rule 17b (FIG. 7). Therefore, the addition unit 23b outputs the packet P3 to the transmission unit 12b with the information indicating that the output is the port Po 2.

In procedure Pr 7, the transmission unit 12b outputs the packet P3 from the port Po 2. Accordingly, the packet P3 is transmitted to the transfer device 10c.

In procedure Pr 8, the transfer device 10c performs the processes similar to the processes in procedures Pr 5 through Pr 7. Then, the addition unit 23c adds the fault information including the following information to the packet P3.
    fault information 3
    fault cause field value: 2
    identifier of transfer device 10: transfer device 10c
    identifier of control device 30: control device 30a
    termination flag: FALSE
The packet to which the addition unit 23c has added the fault information is referred to as a packet P4. The addition unit 23c specifies the output port of the packet P4 using the default transfer rule 17c (FIG. 7). Therefore, the addition unit 23c outputs the packet P3 to the transmission unit 12c with the information indicating that the output is the port Po 4. By the process performed by the transmission unit 12c, the packet P4 is transmitted to the transfer device 10d.

Described below is procedure Pr 9. The reception unit 11d of the transfer device 10d outputs the packet P4 to the destination specification unit 14d. The destination specification unit 14d refers to the transfer rule table 16d. Assume that the transfer rule table 16d does not include any transfer rule applicable to the packet P4. The destination specification unit 14d outputs the packet P4 to the judgment unit 21d.

The judgment unit 21d judges that the control device 30a has become faulty by analyzing the fault information included in the packet P4. However, since the device of which the transfer rule is inquired is the control device 30b, the judgment unit 21d judges that the transfer rule may be requested to the control device 30b, and outputs the packet P4 to the acquisition unit 22d.

Described below is procedure Pr 10. The acquisition unit 22d generates the request message 91d including the information such as the destination MAC address of the packet P4 etc. The acquisition unit 22d transmits the request message 91d to the control device 30b through the transmission unit 12d, and stores the transmission time of the request message 91d.

Described below is procedure Pr 11. When the reception unit 31b of the control device 30b acquires the request message 91d, it outputs the message to the transfer rule determination unit 51b. The transfer rule determination unit 51b determines the transfer rule using the topology information in the network etc. In this example, the transfer rule determination unit 51b generates a reply message 92b for notification to the transfer device 10d that a packet addressed to the terminal 5d is output from the port Po 3 of the transfer device 10d. The transfer rule determination unit 51b outputs the reply message 92b to the transmission unit 32b. The transmission unit 32b transmits the reply message 92b to the transfer device 10d.

Described below is procedure Pr 12. The acquisition unit 22d of the transfer device 10d adds to the transfer rule table 16d that the packet addressed to the terminal 5d is output from the port Po 3 of the transfer device 10d. Furthermore, the acquisition unit 22d outputs to the conversion unit 24d the notification information that the output port of the packet P4 is the port Po 3, and the packet P4.

Described below is procedure Pr 13. By the input of the packet P4 and the specification information about the output port of the packet P4, the conversion unit 24d deletes the fault information from the packet P4. That is, the conversion unit 24d converts the packet P4 into the packet P1. The conversion unit 24d uses the information about the port notified from the acquisition unit 22d as the output port of the converted packet. Therefore, the conversion unit 24d outputs to the transmission unit 12d the packet P1 with the information indicating that the output port of the packet P1 is the port Po 3.

In procedure Pr 14, the transmission unit 12d outputs the packet P1 from the port Po 3. Therefore, the packet P1 is transmitted to the terminal 5d.

In case 1, since the transfer device 10a adds to the packet the fault information indicating that the control device 30a has become faulty, the transfer devices 10b and 10c are free from wasteful inquiry to the faulty control device 30. Therefore, the process load on the transfer devices 10b and 10c is reduced.

[Case 2]

Figure 9:
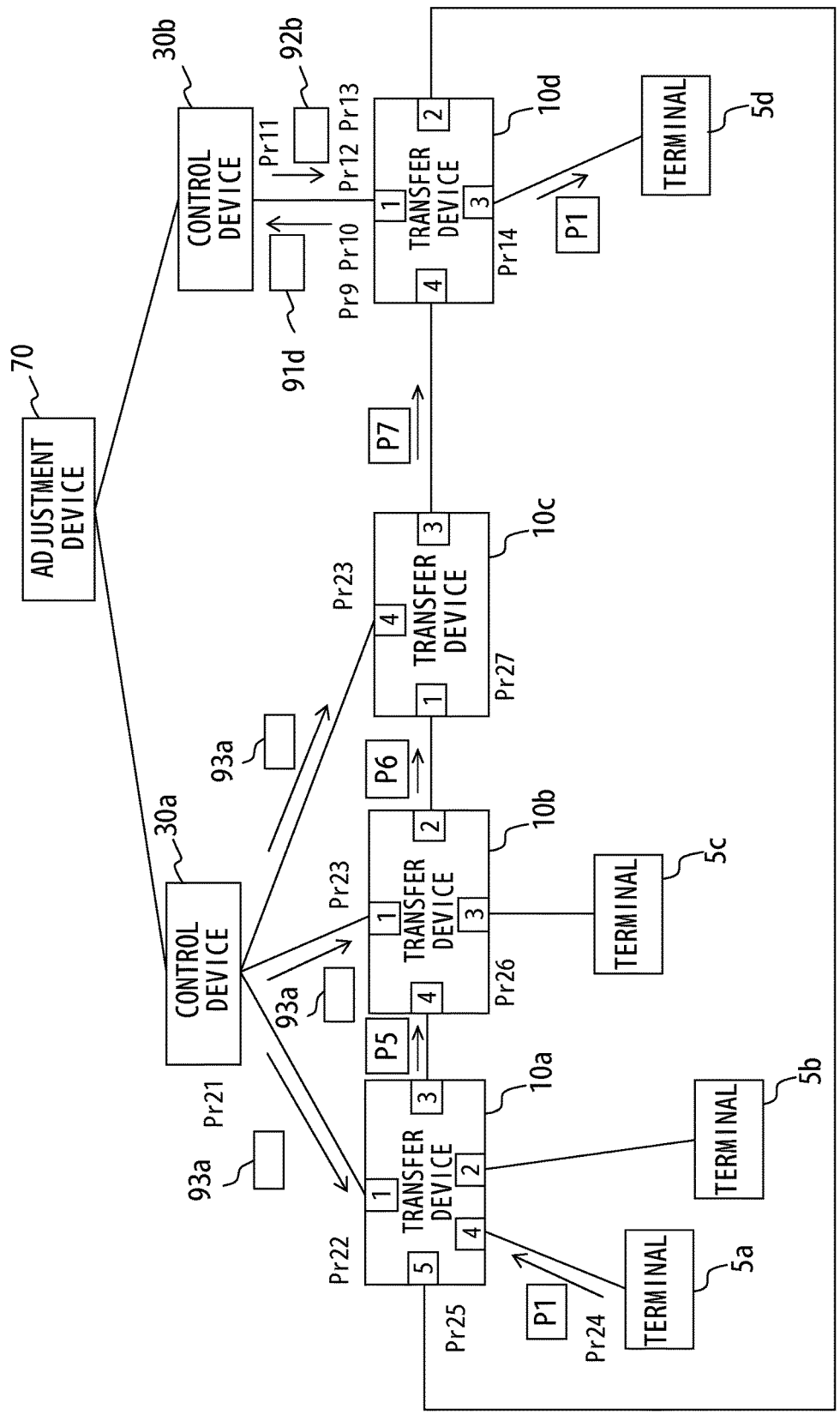
FIG. 9 is an explanatory view of an example of a communicating process performed in the first embodiment.

An example of the process in which the terminal 5a transmits a packet to the terminal 5d when the load of the control device 30a is higher than a specified value is described below with reference to FIG. 9. In the example explained with reference to FIG. 9, the connection among the terminal 5, the transfer device 10, and the control device 30, the transfer rule table 16, and the default transfer rule 17 are similar to those in case 1.

Described below is procedure Pr 21. The transfer rule determination unit 51a of the control device 30a judges that the load has become heavy when the number of request messages received per unit time exceeds a threshold stored in advance. Then, it generates a stop message 93a for requesting stopping the transmission of a new request message, and transmits the message to the connected transfer device 10. Assume that the stop message 93a is a message in an optional format and includes the information that a new request message is not to be processed and an identifier of the control device 30*a*. The control device 30*a* transmits the stop message 93*a* to the transfer devices 10*a* through 10*c*.

Described below is procedure Pr 22. The reception unit 11*a* of the transfer device 10*a* outputs the received stop message 93*a* to the acquisition unit 22*a*. The acquisition unit 22*a* stops requesting a transfer rule to the control device 30*a* until the transmission of a request message to the control device 30*a* is permitted.

In procedure Pr 23, the transfer devices 10*b* and 10*c* perform the processes similar to those in procedure Pr 22.

In procedure Pr 24, it is assumed that the terminal 5*a* generates the packet P1 addressed to the terminal 5*d* afterwards. The packet P1 is transmitted to the transfer device 10*a*.

Described below is procedure Pr 25. The reception unit 11*a* of the transfer device 10*a* outputs the received packet P1 to the destination specification unit 14*a*. When the destination specification unit 14*a* judges that the transfer rule table 16*a* does not include a transfer rule applicable to the packet P1, it outputs the packet P1 to the judgment unit 21*a*. Since the packet P1 does not include fault information, the judgment unit 21*a* outputs the packet P1 to the acquisition unit 22*a*.

Since the transmission of a request message to the control device 30*a* is stopped, the acquisition unit 22*a* outputs to the addition unit 23*a* the packet P1 with the information that the load of the control device 30*a* is heavy. The addition unit 23*a* adds to the packet P1 the fault information including the following information.
    fault information 1
    fault cause field value: 3
    identifier of transfer device 10: transfer device 10*a*
    identifier of control device 30: control device 30*a*
    termination flag: TRUE Since the fault information 1 indicates the fault cause field value of 3, the fault information 1 is processed as disable information. The addition unit 23*a* specifies using the default transfer rule 17*a* (FIG. 7) that the output port of the packet P5 to which fault information is added is the port Po 3. Furthermore, as in procedure Pr 4, the packet P5 is transferred to the transfer device 10*b*.

Described below is procedure Pr 26. The destination specification unit 14*b* of the transfer device 10*b* acquires the packet P5 through the reception unit 11*b*. Since a transfer rule applicable to the packet P5 is not included in the transfer rule table 16*b*, the destination specification unit 14*b* outputs the packet P5 to the judgment unit 21*b*. The judgment unit 21*b* analyzes the fault information included in the packet P5, and judges that the transfer device 10*a* is unable to acquire a transfer rule because the load of the control device 30*a* is heavy. Then, the judgment unit 21*b* judges that a transfer rule is not acquired from the control device 30*a*. The judgment unit 21*b* determines that a request for a transfer rule is not transmitted because the device to which a transfer rule is requested is the control device 30*a*, and outputs the packet P5 to the addition unit 23*b*. The addition unit 23*b* generates a packet P6 obtained by adding the following fault information to the packet P5.
    fault information 2
    fault cause field value: 3
    identifier of transfer device 10: transfer device 10*b*
    identifier of control device 30: control device 30*a*
    termination flag: FALSE Since the packet P6 is output from the port Po 2 using the default transfer rule 17*b* (FIG. 7) as described above in procedures Pr 6 and Pr 7, it is received by the transfer device 10*c*.

Described below is procedure Pr 27. In the transfer device 10*c*, the process similar to that in procedure Pr 26 is performed. Then, the addition unit 23*c* adds the fault information including the following information to the packet P6.
    fault information 3
    fault cause field value: 3
    identifier of transfer device 10: transfer device 10*c*
    identifier of control device 30: control device 30*a*
    termination flag: FALSE Since the packet P7 to which the fault information has been added by the addition unit 23*c* is processed using the default transfer rule 17*c* (FIG. 7), it is transmitted to the transfer device 10*d*.

The process after the reception in the transfer device 10*d* is similar to those in procedures Pr 9 through Pr14.

In case 2, the transfer devices 10*a* through 10*c* notified from the control device 30*a* that the load of the control device 30*a* is higher than a specified value do not request a transfer rule to the control device 30*a*. Therefore, any of the transfer devices 10*a* through 10*c* is not to wastefully inquire of the control device 30*a*, thereby reducing the process load of the transfer devices 10*a* through 10*c*. Furthermore, since the control device 30*a* does not receive or process a new request message while the load is heavy, the recovery of the 30*a* is realized earlier.

[Case 3]

Figure 10:
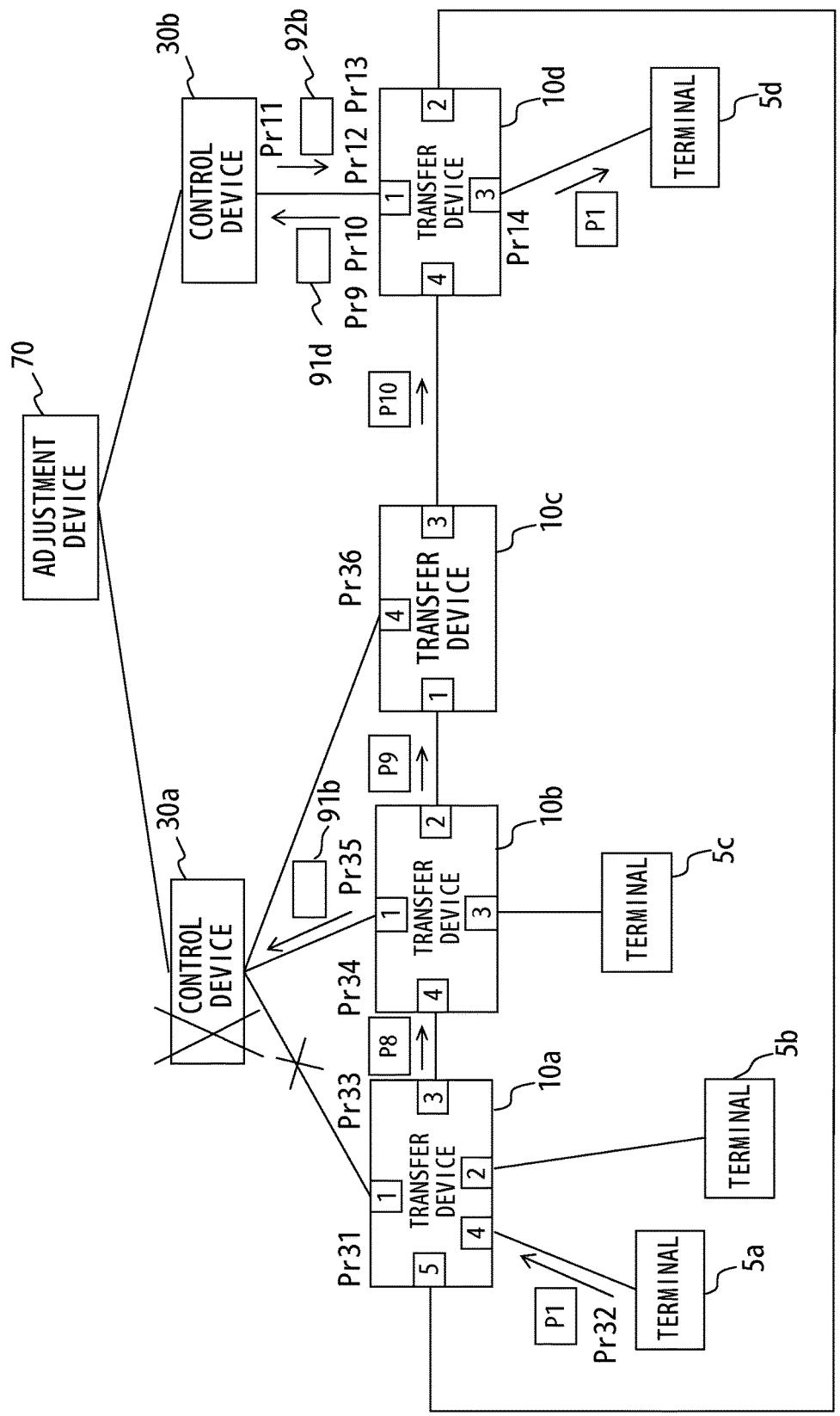
FIG. 10 is an explanatory view of an example of a communicating process performed in the first embodiment.

An example of the process performed when the control device 30*a* becomes faulty, and the session between the transfer device 10*a* and the control device 30*a* is disconnected, and the terminal 5*a* transmits a packet to the terminal 5*d* is explained below with reference to FIG. 10. In the example explained with reference to FIG. 10, the connection among the terminal 5, the transfer device 10, and the control device 30, and the transfer rule table 16 and the default transfer rule 17 used by each transfer device 10 are similar to those in case 1. Assume that the session between the transfer device 10*b* and the control device 30*a* and the session between the transfer device 10*c* and the control device 30*a* are not disconnected.

Described below is procedure Pr 31. The connection management unit 18*a* of the transfer device 10*a* monitors the state of the session between the transfer device 10*a* and the control device 30*a*. Upon detection of the disconnection of the session between the transfer device 10*a* and the control device 30*a*, the connection management unit 18*a* notifies the acquisition unit 22*a* of the disconnection of the session. Then, since the acquisition unit 22*a* is unable to communicate between the transfer device 10*a* and the control device 30*a*, it stops requesting a transfer rule to the control device 30*a*.

In procedure Pr 32, assume that the terminal 5*a* has generated the packet P1 addressed to the terminal 5*d*. The packet P1 is transmitted to the transfer device 10*a*.

Described below is procedure Pr 33. The destination specification unit 14*a* of the transfer device 10*a* acquires the packet P1, and judges whether or not a transfer rule applicable to the packet P1 is included in the transfer rule table 16*a* (FIG. 7). Since there is no transfer rule applicable to the packet P1, the destination specification unit 14*a* outputs the packet P1 to the judgment unit 21*a*. Since the packet P1 does not include fault information, the judgment unit 21*a* outputs the packet P1 to the acquisition unit 22*a*.

Since the transmission of a request message to the control device 30*a* has been stopped, the acquisition unit 22*a* outputs to the addition unit 23*a* the packet P1 with the information that the session between the transfer device 10*a* and the control device 30*a* has been disconnected. The addition unit 23a adds to the packet P1 the fault information including the following information using the information input from the acquisition unit 22a.

fault information 1
fault cause field value: 1
identifier of transfer device 10: transfer device 10a
identifier of control device 30: control device 30a
termination flag: TRUE Since the fault information generated by the addition unit 23a is set to the fault cause field value of 1, it indicates that the fault in acquiring a transfer rule is not the state of the control device 30a. That is, the fault information 1 is not the disable information about the control device 30a. The addition unit 23a specifies using the default transfer rule 17a (FIG. 7) that the output port of the packet P8 to which the fault information has been added is the port Po 3. Furthermore, as with procedure Pr 4, the packet P8 is transferred to the transfer device 10b.

Described below is procedure Pr 34. The destination specification unit 14b of the transfer device 10b acquires the packet P8 through the reception unit 11b. Since the transfer rule table 16b does not include a transfer rule applicable to the packet P8, the destination specification unit 14b outputs the packet P8 to the judgment unit 21b. The judgment unit 21b judges that no disable information is included in the packet P8 by analyzing the fault information included in the packet P8. That is, the judgment unit 21b specifies that the transfer device 10a was unable to acquire a transfer rule because the session between the transfer device 10a and the control device 30a was disconnected. As a result, the judgment unit 21b judges that the transfer device 10b may acquire a transfer rule from the control device 30a if the session between the transfer device 10b and the control device 30a is connected. Then, the judgment unit 21b outputs the packet P8 to the acquisition unit 22b.

Described below is procedure Pr 35. The acquisition unit 22b generates a request message 91b including the information such as the destination MAC address of the packet P8 etc. The acquisition unit 22b transmits the request message 91b to the control device 30a through the transmission unit 12b, and stores the transmission time of the request message 91b. However, since the control device 30a is faulty, the transfer device 10b is unable to acquire a transfer rule from the control device 30a within a specified time from the transmission time of the request message 91b. Therefore, if the specified time has passed from the transmission time of the request message 91b, the acquisition unit 22b outputs the packet P8 to the addition unit 23b. The addition unit 23b adds the following fault information to the packet P8.

fault information 2
fault cause field value: 2
identifier of transfer device 10: transfer device 10b
identifier of control device 30: control device 30a
termination flag: FALSE Since the fault information generated by the addition unit 23b is set to the fault cause field value of 2, it indicates that a transfer rule is not acquired due to the state of the control device 30a. That is, the fault information 2 is the disable information about the control device 30a. The addition unit 23b specifies using the default transfer rule 17b (FIG. 7) the output port of a packet P9 to which fault information has been added. The addition unit 23b outputs to the transmission unit 12b the packet P9 with the information indicating that the output port is the port Po 2. The packet P9 is transmitted to the transfer device 10c by the process of the transmission unit 12b.

Described below is the procedure Pr 36. When the transfer device 10c receives the packet P9, the judgment unit 21c analyzes the fault information in the packet P9. The packet P9 includes the fault information 1 and the fault information 2. While the fault information 1 is not disable information, the fault information 2 is disable information. Thus, a fault information header includes disable information and information which is not disable information. If the two pieces of information are related to the same control device 30, the judgment unit 21 prioritizes the disable information. In this case, between the fault information 1 and the fault information 2, the judgment unit 21c uses the fault information 2 which may be used as disable information as the cause which has occurred during the acquisition of a transfer rule. Then, since the transfer device 10b which has tried to acquire a transfer rule from the control device 30a has failed in acquiring the transfer rule due to time-out, the judgment unit 21c judges that the control device 30a has become faulty. Therefore, the judgment unit 21c judges that the transfer device 10c is also unable to acquire a transfer rule from the control device 30a, and determines not to inquire about a transfer rule. The judgment unit 21c output the packet P9 to the addition unit 23c. The addition unit 23c generates a packet P10 by a process similar to that in procedure Pr 8. The packet P10 is transmitted to the transfer device 10d by a process similar to that in procedure Pr 8.

The process performed after the transfer device 10d receives the packet P10 is similar to the processes in procedure Pr 9 through 14 described in case 1 above.

In case 3, since the transfer device 10b adds to a packet the fault information indicating that the control device 30a has become faulty, the transfer device 10c is not to wastefully inquire of the faulty control device 30. In this case, the case in which the control device 30a has become faulty is explained as an example. However, when the control device 30a has not become faulty, the transfer device 10b may acquire a transfer rule from the control device 30a by the processes in procedures Pr 34 and Pr 35. That is, since the transfer device 10 considers not only the occurrence of a fault but also the cause of the fault when judging whether or not an inquiry about a transfer rule is to be issued, it is appropriately judged whether or not the inquiry of a transfer rule is to be issued, thereby suppressing a wasteful inquiry.

Figure 11:
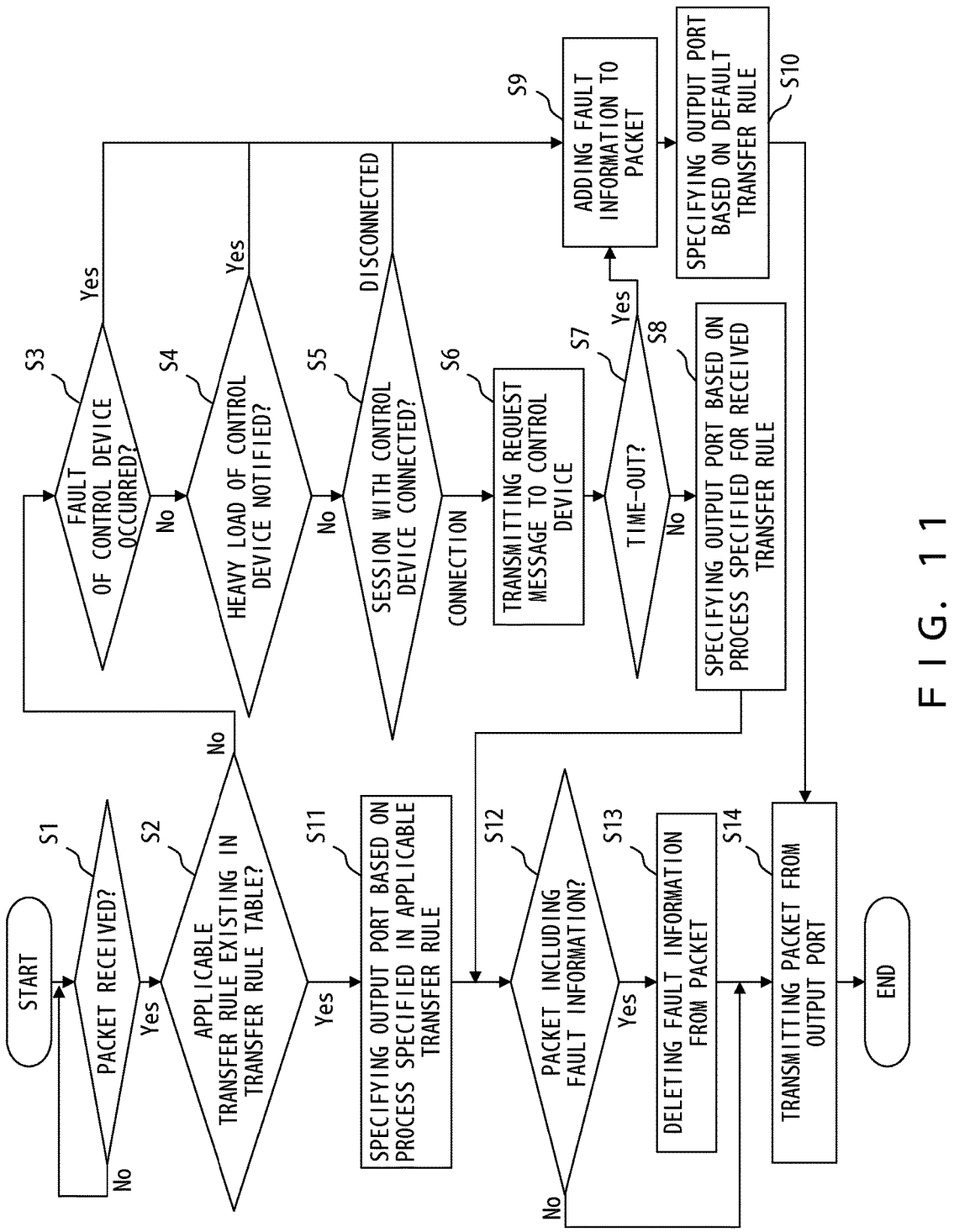
FIG. 11 is a flowchart for explanation of an example of an operation of the transfer device.

FIG. 11 is a flowchart for explanation of an example of an operation of the transfer device 10. FIG. 11 is an example of an operation of the transfer device 10, and may arbitrarily change the order of steps S3 through S5. The transfer device 10 waits for the reception of a packet (step S1). The destination specification unit 14 judges whether or not the transfer rule applicable to the received packet is included in the transfer rule table 16 (step S2). Unless an appropriate transfer rule is included in the transfer rule table 16, the destination specification unit 14 outputs the packet to the judgment unit 21 (NO in step S2). By analyzing the fault information in the packet, the judgment unit 21 judges whether or not the notification that the control device 30 to which a transfer rule is requested has become faulty has been issued (step S3). If it is notified according to the fault information in the packet that the notification of the occurrence of the fault in the control device 30 has been issued, the judgment unit 21 determines that a request message is not to be transmitted, and outputs the packet to the addition unit 23 (YES in step S3). The addition unit 23 adds the fault information to the input packet, and specifies an output port using the default transfer rule 17 (steps S9 and S10). Then, the transfer device 10 transmits the packet from the output port (step S14).

If the occurrence of a fail in the control device 30 has not been notified, the judgment unit 21 judges whether or not the heavy load in the control device 30 has been notified (step S4 after NO in step S3). If the heavy load in the control device 30 has been notified, the judgment unit 21 determines that the request message is not to be transmitted and outputs the packet to the addition unit 23 (YES in step S4). Afterwards, the processes in steps S9, S10, and S14 are performed.

The heavy load in the control device 30 has not been notified, the judgment unit 21 outputs the packet to the acquisition unit 22 (NO in step S4). The acquisition unit 22 judges that the session between the transfer device 10 and the control device 30 is being maintained (step S5). When the session between the transfer device 10 and the control device 30 is disconnected, the acquisition unit 22 determines that the request message is not to be transmitted, and outputs the packet to the addition unit 23 (disconnection in step S5). Afterwards, the processes in steps S9, S10, and S14 are performed.

When the session between the transfer device 10 and the control device 30 is being maintained, the acquisition unit 22 transmits the request message to the control device 30 (step S6 after connection in step S5). When a transfer rule is not received within a specified time from the transmission time of the request message, the acquisition unit 22 judges that time-out has occurred, and outputs the packet to the addition unit 23 (YES in step S7). When the packet is input from the acquisition unit 22, the addition unit 23 judges that time-out has occurred, and adds to the packet the fault information in which the occurrence of a fault in the control device 30 is notified as the cause of the fault (step S9). Afterwards, the processes in steps S10 and S14 are performed.

When a transfer rule is received within a specified time from the transmission time of the request message, the acquisition unit 22 specifies the output port of the packet using the received transfer rule (step S8 after NO in step S7). The acquisition unit 22 outputs to the conversion unit 24 the packet with the information for specification of the output port of the packet. The conversion unit 24 judges whether or not the fault information is included in the packet input from the acquisition unit 22 (step S12). When fault information is included in the packet, the conversion unit 24 deletes the fault information (step S13 after YES in step S12). The conversion unit 24 outputs to the transmission unit 12 the packet from which the fault information has been deleted with the port number notified from the acquisition unit 22. The transmission unit 12 transmits the packet from the port notified from the conversion unit 24 (step S14).

In step S2, when it is judged that a transfer rule applicable to a packet is included in the transfer rule table 16, the destination specification unit 14 specifies an output port using the transfer rule (step S11). Then, the destination specification unit 14 outputs the packet to the conversion unit 24 with the information for specification of the output of the packet. Then, the processes in steps S12 through S14 are performed.

According to the first embodiment, since the occurrence of a fault in the control device 30 and the heavy process load of the control device 30 are notified by the fault information, the transfer device 10 does not inquire about the control device 30 to be notified according to the fault information. Therefore, the wasteful process of the transfer device 10 may be reduced. Furthermore, when the process load is heavy in the control device 30, the increase of the load of the control device 30 may be suppressed by stopping an inquiry from the transfer device 10, thereby enabling the recovery of the control device 30 to be realized quickly.

In the example explained with reference to FIGS. 6 through 11, the destination of the packet is the terminal 5d connected to the transfer device 10d which may be communicated with the unfaulty control device 30b. However, the destination of the packet may be the terminal 5 subordinate to the control device 30 as with the terminal 5 of the source such as the terminal 5c. When any transfer device 10 does not hold a transfer rule of the packet addressed to the terminal 5c, the packet addressed to the terminal 5c is transferred to the transfer device 10d as described above.

The transfer device 10d inquires of the control device 30b about the transfer rule by the process similar to those in procedures Pr 9 and Pr 10. The control device 30b acquires the connection relationship between the transfer device 10 connected to the control device 30a and the terminal 5 by the communication with the adjustment device 70. Then, the control device 30b specifies that the terminal 5c is connected to the transfer device 10b, and determines the transfer rule in the transfer device 10d for the packet addressed to the terminal 5c. For example, assume that the control device 30b notifies the transfer device 10d that, as a transfer rule, the packet addressed to the terminal 5c is output from the port Po 2. Then, by the processes similar to those in procedures Pr 12 and Pr 13, the transfer device 10d transfers to the transfer device 10a the packet addressed to the terminal 5c. When the transfer device 10a the transfer device 10a establishes a communication with the control device 30b before it receives the packet from the transfer device 10d, the transfer device 10a may acquire a new transfer rule from the control device 30b. Therefore, the transfer device 10a transmits the packet to the transfer device 10b using a transfer rule. Therefore, when the transfer device 10b establishes a communication with the control device 30b before it receives the packet from the transfer device 10a, the transfer device 10b may also acquire a new transfer rule from the control device 30b. Therefore, the transfer device 10b may transmit the packet to the terminal 5c using the transfer rule.

Second Embodiment

Described in the second embodiment is an example of the case in which a control device 80 which receives a request message notifies of the path to the destination of the packet to be inquired about for a transfer rule. In the second embodiment, although a packet is transferred to the transfer device 10 which is unable to acquire a new transfer rule, the packet is transferred to the destination terminal 5 according to the path information in the packet.

FIG. 12 is an example of the configuration of the control device 80 used in the second embodiment. The control device 80 includes the reception unit 31, the transmission unit 32, the connection management unit 33, a path addition unit 40, the application processing unit 45, a path calculation control unit 55, and the storage unit 60. The path calculation control unit 55 includes the transfer rule determination unit 51 and a path calculation unit 52. The operations of the reception unit 31, the transmission unit 32, the connection management unit 33, the application processing unit 45, and the storage unit 60 are similar to those of the control device 30.

The transfer rule determination unit 51 analyzes the request message of a transfer rule, thereby judging whether or not the fault information is included in the packet which has caused an inquiry about a transfer rule. In the second embodiment, assume that the transfer device 10 includes the packet which is subject to an inquiry about a transfer rule in the request message. The transfer rule determination unit 51 analyzes the packet in the request message, thereby judging whether or not the fault information is included in the packet. When the fault information is included in the packet in an inquiry about a transfer rule, the transfer rule determination unit 51 outputs a request message to the path calculation unit 52 and the path addition unit 40. On the other hand, unless the fault information is included in the packet in an inquiry about a transfer rule, the transfer rule determination unit 51 processes the request message as in the first embodiment.

Using the topology information in the network etc., the path calculation unit 52 calculates the path from the transfer device 10 as the source of the request message to the destination of the packet in an inquiry about a transfer rule. The path calculation unit 52 outputs a calculation result to the path addition unit 40. The path addition unit 40 specifies the output port of each transfer device 10 included in the path using the calculation result notified from the path calculation unit 52 and the network information 61. Furthermore, the path addition unit 40 extracts the packet in an inquiry about a transfer rule from the request message. The path addition unit 40 includes the information for specification of an output port for each transfer device 10 in the extracted packet. The path addition unit 40 outputs to the transmission unit 32 a packet including the information for specification of an output port.

The hardware configuration of the control device 80 is illustrated in FIG. 5. In the control device 80, the processor 101 operates as the connection management unit 33, the path addition unit 40, the application processing unit 45, and the path calculation control unit 55. The memory 102 operates as, for example, the storage unit 60. The network connection device 104 realizes the reception unit 31 and the transmission unit 32.

Figure 13:
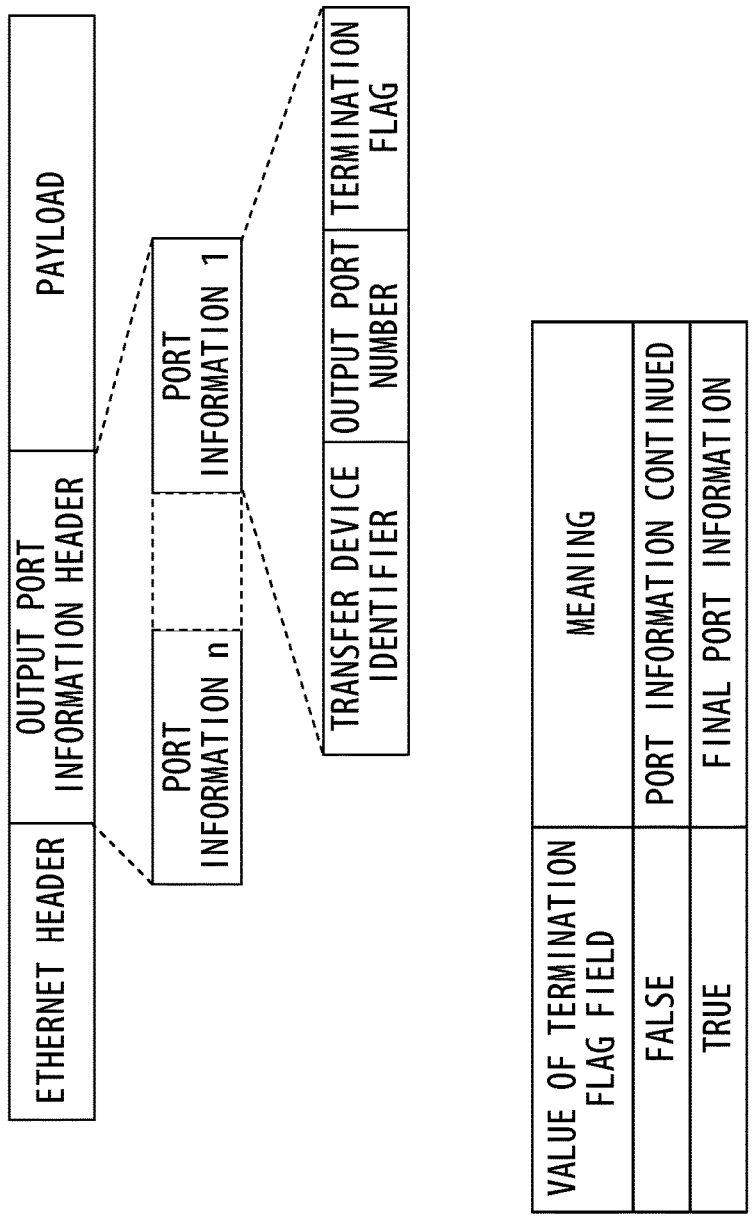
FIG. 13 is an example of a format of a packet including the information about an output port.

FIG. 13 is an example of a format of a packet including the information about an output port. The payload and the Ethernet header in FIG. 13 are the payload and the Ethernet header of the packet extracted by the path addition unit 40. The path addition unit 40 deletes a fault information header from the packet extracted from the request message, and adds an output port information header. For example, as illustrated in FIG. 13, the path addition unit 40 may add an output port information header between the payload and the Ethernet header. The output port information header includes one or more pieces of port information. In the following explanation, the port information is arranged in the ascending order of the hop count from the control device 80, and it is assumed that the port information closest to the payload is the information used by the transfer device 10 connected to the terminal 5 as the destination of the packet. In the example in FIG. 13, the port information 1 indicates the output port of the transfer device 10 connected to the terminal 5 as the destination of the packet. In the example in FIG. 13, one piece of port information includes an identifier of the transfer device 10, an output port number, and a termination flag.

The termination flag is used when the device which is processing the packet from the head specifies the termination of the output port information header. The termination flag TRUE indicates that the port information is the information about the trailer of the output port information header. On the other hand, the termination flag FALSE indicates that another piece of port information is included after the port information. In the explanation below, in the information about the output port of the transfer device 10 connected to the terminal 5 as the destination of the packet, the termination flag TRUE is set. In another transfer device 10, the termination flag FALSE is set. The trailing information about the output port information header is the information about the transfer device 10 connected to the destination of the target packet. Therefore, the termination flag TRUE is also the information indicating that the transfer device 10 to which the port information is applied is connected to the terminal 5 as the destination of the target packet.

Figure 14:
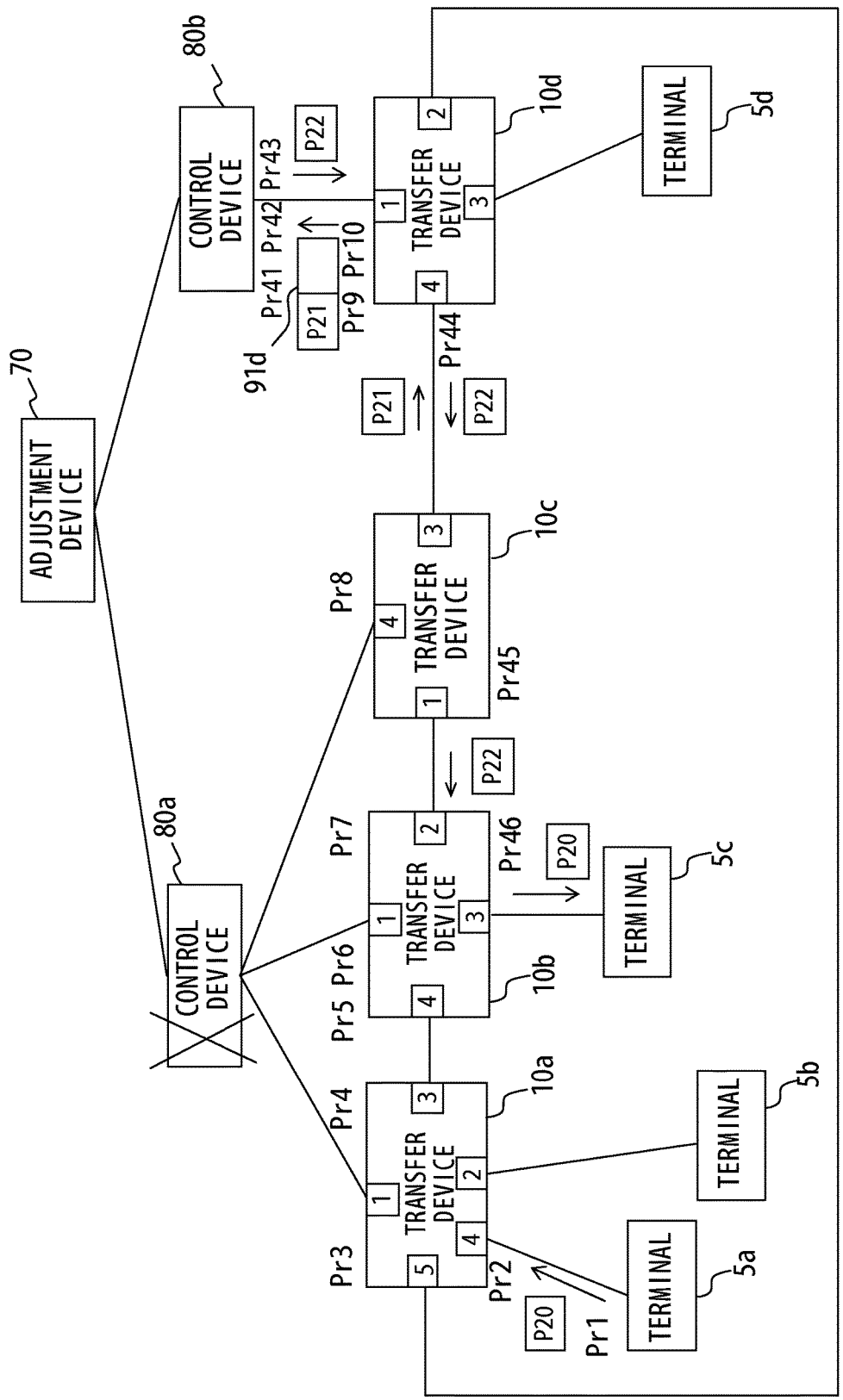
FIG. 14 is an explanatory view of an example of a communicating process performed in the second embodiment.

FIG. 14 is an example of a communicating process performed according to the second embodiment. FIG. 14 also illustrates an example of a network explained above with reference to FIG. 6 etc., and the connection among the terminal 5, the transfer device 10, the control device, and the adjustment device 70 is similar to that according to the first embodiment. Described below is an example of the communicating process with reference to an example of the case in which a packet is transmitted from the terminal 5*a* to the terminal 5*c* in the period in which the transfer devices 10*a* through 10*c* are unable to acquire a new transfer rule due to the occurrence of a fault in the control device 80*a*. In the explanation below, assume that no transfer device 10 holds a transfer rule applicable to the packet addressed to the terminal 5*c*.

When a packet P20 addressed to the terminal 5*c* is generated in the terminal 5*a*, and transferred to the transfer device 10*a*, the process similar to the process described above with reference to procedures Pr 1 through Pr 10 of the first embodiment is performed. The packet received by the transfer device 10*d* from the transfer device 10*c* is described as a packet P21. The acquisition unit 22*d* includes the packet P21 in the request message 91*d*. Therefore, the packet P21 included in the request message 91*d* contains the fault information added by the transfer devices 10*a* through 10*c*. Furthermore, the information other than the fault information header of the packet P21 is the same as the information about the packet P20 generated by the terminal 5*a*.

Described below is procedure Pr 41. The reception unit 31*b* of the control device 80*b* outputs the request message 91*d* to the transfer rule determination unit 51*b*. The transfer rule determination unit 51*b* judges whether or not the fault information is included in the packet P21 contained in the request message. Since the fault information is included in the packet P21 in this example, the request message 91*d* is output to the path calculation unit 52*b*.

Described below is procedure Pr 42. The path calculation unit 52*b* calculates the path from the transfer device 10*d* to the terminal 5*c* according to the connection relationship in the network. The connection relationship in the network may be the information stored in the storage unit 60*b*, and may be the information acquired from the adjustment device 70. The path calculation unit 52*b* outputs the information about the acquired path to the path addition unit 40.

Described below is procedure Pr 43. The path addition unit 40*b* specifies the output port of each transfer device 10 according to the network information 61*b* stored in the storage unit 60*b* and the path information notified from the path calculation unit 52*b*. Furthermore, the path addition unit 40*b* acquires the packet P20 from the request message 91*d*, and includes in the packet P20 the output port information header including the following information.

port information 3
  identifier of transfer device 10: transfer device 10*d*
  output port: port Po 4
  termination flag: FALSE
port information 2
  identifier of transfer device 10: transfer device 10*c*
  output port: port Po 1
  termination flag: FALSE
port information 1
  identifier of transfer device 10: transfer device 10*b*
  output port: port Po 3
  termination flag: TRUE The packet with the output port information header added to the packet P20 is hereafter referred to as a packet P22. The path addition unit 40*b* outputs the packet P22 to the transmission unit 32*b*. The transmission unit 32*b* transmits the packet P22 to the transfer device 10*d*.

Described below is procedure Pr 44. The reception unit 11*d* of the transfer device 10*d* outputs the packet P22 to the acquisition unit 22*d*. The acquisition unit 22*d* judges whether or not the acquisition unit 22 includes an output port information header. Since the packet P22 includes an output port information header, the acquisition unit 22*d* outputs the packet P22 to the destination specification unit 14*d*. The destination specification unit 14*d* extracts the port information (port information 3) which records the output port of the transfer device 10*d*. In the extracted port information, the port Po 4 is set as an output port. Then, the destination specification unit 14 outputs the packet P22 to the transmission unit 12*d* with the information indicating that the port Po 4 is the output port. By the transmission unit 12*d* outputting the packet P22 from the port Po 4, the packet P22 is transmitted to the transfer device 10*c*.

Described below is procedure Pr 45. The destination specification unit 14*c* of the transfer device 10*c* acquires the packet P22 through the reception unit 11*d*. At this time point, assume that the transfer device 10*c* has not established a connection with the control device 80*b*, and the control device 80*a* has not recovered from a fault. Therefore, the transfer device 10*c* is unable to acquire a new transfer rule. When the destination specification unit 14*c* judges that the packet P22 includes an output port information header, it processes the output port information header as with procedure Pr 44. Therefore, the destination specification unit 14*c* specifies that the port Po 1 is the output port from the transfer device 10*c* according to the port information 2 instead of using the transfer rule. Then, the destination specification unit 14*c* outputs the packet P22 to the transmission unit 12*c* with the information indicating that the port Po 1 is the output port. By the transmission unit 12*c* outputting the packet P22 from the port Po 1, the packet P22 is transmitted to the transfer device 10*b*.

Described below is procedure Pr 46. Since the destination specification unit 14*b* of the transfer device 10*b* performs a process similar to that in procedure Pr 45, it specifies that the output port from the transfer device 10*b* is the port Po 3 according to the port information 1. Furthermore, since the termination flag of the port information 1 is TRUE, the destination specification unit 14*b* deletes the output port information header from the packet P22. By the process, the transfer device 10*b* converts the packet P22 into the packet P20. The destination specification unit 14*b* outputs the packet P20 to the transmission unit 12*b* with the information indicating that the port Po 3 is the output port. By the transmission unit 12*b* outputting the p20 from the port Po 3, the packet P20 is transmitted to the terminal 5*c*.

The case in which a control device in a network is the control device 80 is explained above with reference to FIG. 14. However, the network may include both control devices 80 and 30.

FIG. 15 is a flowchart for explanation of an example of an operation of the control device 80. The transfer rule determination unit 51 acquires a request message through the reception unit 31. FIG. 15 is an example of an operation performed in the network in which the control devices 80 communicate directly with one another as the network N2 illustrated in FIG. 4. The transfer rule determination unit 51 judges whether or not the process load of the control device 80 is heavy according to the result of the comparison between the number of request messages received per unit time by the control device 80 and the threshold (step S21). When the process load of the control device 80 is heavy, the transfer rule determination unit 51 terminates the process on the request message (YES in step S21). On the other hand, when the process load is not heavy, the connection management unit 33 judges whether or not the communication with another control device 80 may be performed (step S22 after NO in step S21). If the communication with another control device 80 is not to be performed, the control device 80 terminates the process (YES in step S22). If the communication with another control device 80 may be performed, the transfer rule determination unit 51 judges whether or not the fault information is included in the request message (step S23 after NO in step S22). Unless the fault information is not included in the request message, the transfer rule determination unit 51 generates a transfer rule, and transmits it to the source of the request message through the transmission unit 32 (step S24 after NO in step S23).

On the other hand, when the fault information is included in the request message, the transfer rule determination unit 51 detects that another control device 80 has become faulty (step S25 after YES in step S23). The transfer rule determination unit 51 outputs the request message to the path calculation unit 52. The path calculation unit 52 calculates the path from the source of the request message to the destination of the packet included in the request message (step S26). The path addition unit 40 specifies the output port of each transfer device transfer devices 10 according to the result of the calculation by the path calculation unit 52, and includes the output port information header in the packet included in the request message (step S27). The path addition unit 40 transmits the packet including the output port information header through the transmission unit 32 (step S28). Afterwards, the transfer rule determination unit 51 notifies the source of the request message of the transfer rule for using the path calculated by the path calculation unit 52 (step S29).

The control device 80 may operate in the network including both control devices 30 and 80 as described above with reference to FIG. 15.

Figure 16:
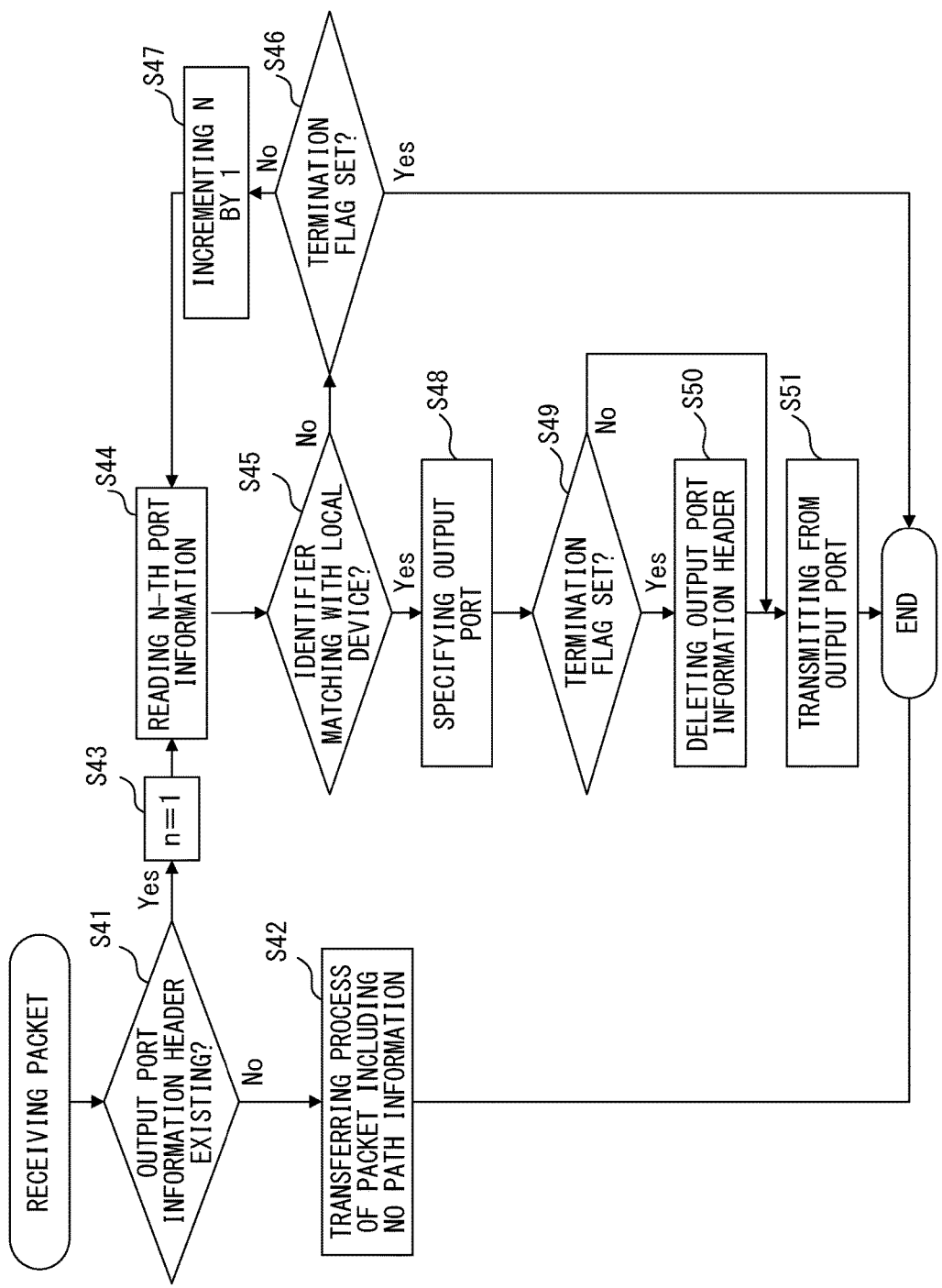
FIG. 16 is a flowchart for explanation of an example of an operation of the transfer device.

FIG. 16 is a flowchart for explanation of an example of an operation of the transfer device 10. FIG. 16 is an example of an operation performed when the process of transferring a packet is performed. The transfer device 10 receives a packet. The destination specification unit 14 judges whether or not the received packet includes an output port information header (step S41). If the received packet does not include an output port information header, the destination specification unit 14 performs a transferring process after judging that a packet including no path information has been received (step S42 after NO in step S41). The process in step S42 is explained above with reference to FIG. 11. On the other hand, when a packet including an output port information header is received, the destination specification unit 14 sets the variable n to 1 (step S43 after YES in step S41). In this example, n indicates a variable used to identify the port information in the output port information header. The destination specification unit 14 reads the n-th port information from the head of the packet, and judges whether or not the identifier of its own device is included (steps S44 and S45). If the identifier of its own device is not included, the destination specification unit 14 judges whether or not the termination flag of the read port information is set as TRUE (step S46 after NO in step S45). When the termination flag of the port information is set as TRUE, the destination specification unit 14 terminates the process (YES in step S46). When the termination flag of the port information is not set as TRUE, the destination specification unit 14 increments n by 1, and performs the processes in and after step S44 (step S47 after NO in step S46).

On the other hand, when the identifier of its own device is included in the read port information, the destination specification unit 14 specifies an output port (step S48 after YES in step S45). Furthermore, the destination specification unit 14 judges whether or not the termination flag of the read port information is set as TRUE (step S49). If the termination flag of the read port information is set as TRUE, the destination specification unit 14 deletes the output port information header from the packet to be processed, and outputs the packet to the transmission unit 12 (step S50 after YES in step S49). Afterwards, the transmission unit 12 transmits the packet from the specified output port (step S51).

In the second embodiment, upon receipt of an inquiry about a transfer rule, the control device 80 inserts into the packet to be processed the information about the output port of the transfer device 10 in the path up to the destination as an output port information header. Therefore, each transfer device 10 may specify an output port for the packet by referring to the output port information header. That is, the transfer device 10 may transfer a packet to a destination even in a situation in which a new transfer rule is not to be acquired. For example, in the case in FIG. 14, although none of the transfer device 10b and the transfer device 10c is not to acquire a transfer rule from the control device 80, the transfer device 10b and the transfer device 10c may perform the transferring process using the output port information header.

Therefore, according to the second embodiment, although a packet is transferred to the terminal 5 connected to the transfer device 10 which is unable to acquire a transfer rule, the transferring process may be performed before the transfer device 10 becomes enabled to acquire a transfer rule.

Third Embodiment

The control device 80 which has received a request message may notify of a transfer rule to be used by each transfer device 10 instead of the path to the destination of the packet in an inquiry about a transfer rule. In this case, the path addition unit 40 transmits to the source of the request message a packet including a transfer rule available by each transfer device 10 included in the acquired path.

Figure 17:
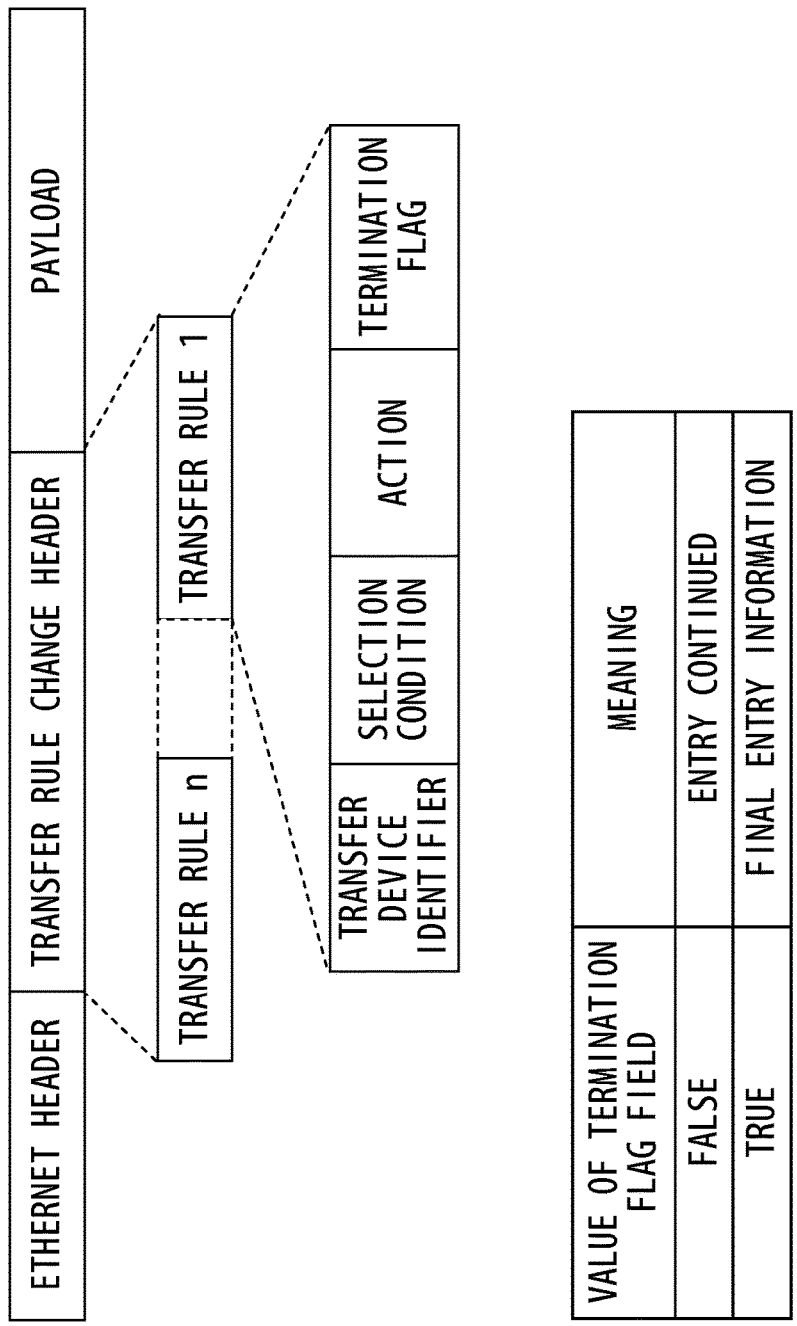
FIG. 17 is an example of a format of a packet including a transfer rule.

FIG. 17 is an example of a format of a packet including a transfer rule. The payload and the Ethernet header in FIG. 17 are the payload and the Ethernet header of the packet extracted from the request message by the path addition unit 40. The path addition unit 40 deletes the fault information header from the acquired packet, and adds a transfer rule change header. In the example in FIG. 17, the path addition unit 40 adds a transfer rule change header between the payload and the Ethernet header. The transfer rule change header includes one or more transfer rules. In the following explanation, it is assumed that the transfer rules are arranged in the ascending order of the hop count from the control device 80, and the port information closest to the payload is the information used in the transfer device 10 connected to the terminal 5 as the destination of the packet. In the example in FIG. 17, the transfer rule 1 is the information indicating the output port in the transfer device 10 to which the terminal 5 as the destination of the packet is connected. In the example in FIG. 17, the identifier of the transfer device 10, the selection condition of a packet, the action for the selected packet, and the termination flag are included in one transfer rule. The termination flag is similar to the packet including the output port information header explained with reference to FIG. 13. Therefore, the termination flag TRUE is the information that the transfer device 10 which uses the transfer rule is connected to the terminal 5 as the destination of the packet to be processed.

FIG. 18 is an explanatory view of an example of a processing method according to a transfer rule. In the example in FIG. 18, it is assumed that the connection information in the network is shared between the control devices 80c and 80d. The method for sharing information between the control devices 80c and 80d is any of the methods described above with reference to FIG. 4. The control device 80c is connected to the transfer devices 10e and 10f, and the control device 80d is connected to the transfer device 10g. Furthermore, the transfer device 10f may communicate a packet with the transfer devices 10e and 10g. The terminal 5B is connected to the transfer device 10e, and the terminal 5A is connected to the transfer device 10f. FIG. 18 is an example of a network, and the number of the control devices 80, the transfer devices 10, and the terminals 5 may be arbitrarily changed.

In the network in FIG. 18, assume that the terminal 5A transmits a packet to the terminal 5B when the transfer devices 10f and 10e are unable to acquire a new transfer rule from the control device 80c due to the occurrence of a fault in the control device 80c. In this example, assume that the transfer device 10f holds the transfer rule table 16f_1 in FIG. 19 when the a packet addressed to the terminal 5B is transmitted from the terminal 5A. Similarly, assume that the transfer device 10e holds the transfer rule table 16e_1 (FIG. 19), and the transfer device 10g holds the transfer rule table 16g_1 (FIG. 19).

Described below is procedure Pr 51. The transfer device 10f receives a packet P30 addressed to the terminal 5B from the terminal 5A. The destination specification unit 14f judges that no transfer rule applicable to the packet P30 addressed to the terminal 5B is included in the transfer rule table 16f_1. Afterwards, a packet P31 is generated by adding fault information to the packet P30 by the process similar to that explained in procedures Pr 2 and Pr 3 in the first embodiment. Furthermore, assume that the packet P31 is transferred to the transfer device 10g using the default transfer rule 17e (not illustrated in the attached drawings).

Described below is procedure Pr 52. The destination specification unit 14g of the transfer device 10g judges that no transfer rule applicable to the packet P31 addressed to the terminal 5B is included in the transfer rule table 16g_1. Then, the acquisition unit 22g transmits a request message 91g to the control device 80d. The acquisition unit 22g includes the packet P31 in the request message 91g.

Described below is procedure Pr 53. By the process similar to those in procedures Pr 41 and Pr 42, the path from the transfer device 10g to the terminal 5B is calculated. Here, the path from the transfer device 10g through the transfer device 10f and 10e to the terminal 5B is calculated Described below is procedure Pr 54. The path addition unit 40d specifies the output port for each transfer device according to the path acquired from the path calculation unit 52d and the network information 61. Next, the path addition unit 40 generates a transfer rule with the output port obtained for each transfer device 10 associated with the destination of the packet P31. For example, when the output port of the transfer device 10g is the port Po 1, the following transfer rule is generated in association with the destination of the packet.

transfer rule T3
    identifier of transfer device 10: transfer device 10g
    selection condition address of terminal 5B as destination MAC address
    action: output from port Po 1

Furthermore, since the transfer device 10g is the source of the request message 91g, the termination flag is set as FALSE. Similarly, the path addition unit 40d generates the transfer rule T2 used by the transfer device 10f and the transfer rule T1 used by the transfer device 10e as follows.

transfer rule T2
    identifier of transfer device 10: transfer device 10f
    selection condition address of terminal 5B as destination MAC address
    action: output from port Po 2
    termination flag: FALSE
    transfer rule T1
    identifier of transfer device 10: transfer device 10e
    selection condition address of terminal 5B as destination MAC address
    action: output from port Po 1
    termination flag: TRUE The path addition unit 40d records the obtained transfer rules T1 through T3 on the transfer rule header, and adds the transfer rule header between the payload of the packet P31 and the Ethernet. Furthermore, the fault information header in the packet P31 is deleted. FIG. 18 illustrates a packet P32 including the transfer rule change header. The control device 80d transmits the packet P32 to the transfer device 10d.

Described below is pr55. The acquisition unit 22g of the transfer device 10g acquires the packet P32 through the reception unit 11g. The acquisition unit 22g judges whether or not the packet P32 includes a transfer rule change header. Since the transfer rule change header is included in the packet P32, the acquisition unit 22g outputs the packet P32 to the destination specification unit 14g. The destination specification unit 14g extracts the transfer rule T3 used by the transfer device 10g. The destination specification unit 14g updates the transfer rule table 16g_1 (FIG. 19) into the transfer rule table 16g_2 (FIG. 19) using the obtained transfer rule. Furthermore, since the packet P32 is a packet addressed to the terminal 5B, the destination specification unit 14g outputs the packet P32 from the port Po 1 according to the transfer rule table 16g_2, thereby transmitting the packet P32 to the transfer device 10f.

Described below is procedure Pr 56. The destination specification unit 14f of the transfer device 10f acquires the packet P32 through the reception unit 11f. The destination specification unit 14f judges whether or not the packet P32 includes a transfer rule change header. Since the packet P32 includes the transfer rule change header, the destination specification unit 14f extracts the transfer rule T2 used by the transfer device 10f from the transfer rule change header. The destination specification unit 14f updates the transfer rule table 16f_1 (FIG. 19) into the transfer rule table 16f_2 (FIG. 19) using the obtained transfer rule. Furthermore, since the packet P32 is a packet addressed to the terminal 5B, the destination specification unit 14f outputs the packet P32 from the port Po 2 according to the transfer rule table 16f_2, thereby transmitting the packet P32 to the transfer device 10e.

Described below is procedure Pr 57. By the process similar to that in procedure Pr 56, the destination specification unit 14e updates the transfer rule table 16e_1 (FIG. 19) into the transfer rule table 16e_2 (FIG. 19) according to the transfer rule T1. Furthermore, since the termination flag included in the transfer rule T1 is set as TRUE, the destination specification unit 14e deletes the transfer rule change header from the packet P32, and changes the packet P32 into the packet P30. The transfer device 10e transmits the packet P30 to the terminal 5B by processing the packet P30 using the transfer rule table 16e_2.

Figure 20:
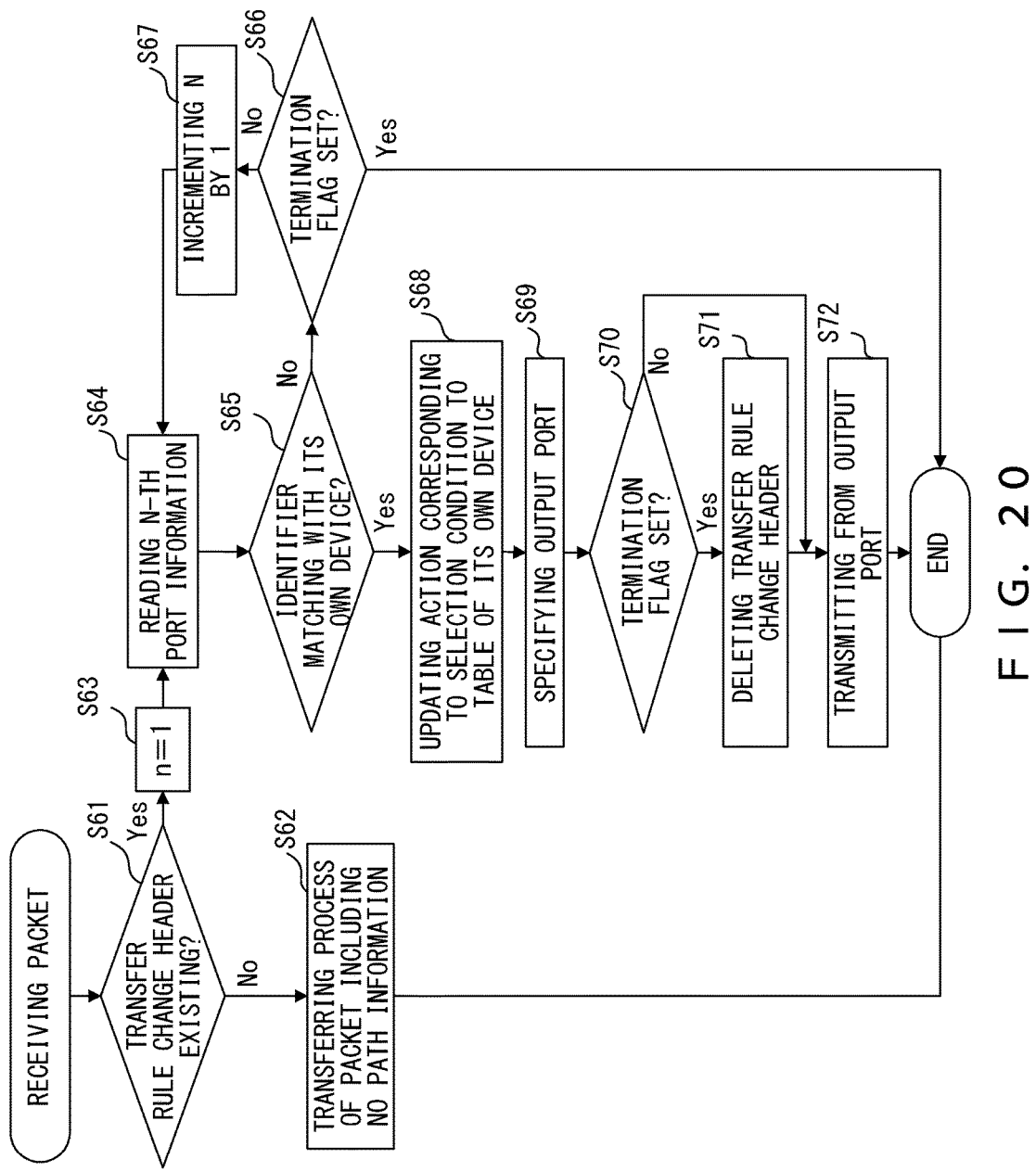
FIG. 20 is a flowchart for explanation of an example of an operation of the transfer device.

FIG. 20 is a flowchart for explanation of an example of an operation of the transfer device according to the third embodiment. FIG. 20 is an example of an operation performed when a packet is transferred. The destination specification unit 14 receives a packet from the control device 80 through the reception unit 11. The destination specification unit 14 judges whether or not the received packet includes a transfer rule change header (step S61). If the received packet does not include a transfer rule change header, the destination specification unit 14 judges that a packet including no path information has been received, and performs the transferring process (step S62 after NO in step S61). The process in step S62 is explained with reference to FIG. 11. The processes in steps S63 through S67 are similar to those in steps S43 through S47 which have been explained with reference to FIG. 16.

When the read transfer rule includes the identifier of its own device, the destination specification unit 14 updates the transfer rule table 16 (step S68 after YES in step S65). Furthermore, the destination specification unit 14 specifies the output port (step S69). The destination specification unit 14 executes whether or not the termination flag of the read port information is set as TRUE (step S70). If the termination flag of the read port information is set as TRUE, the destination specification unit 14 deletes the transfer rule change header from the packet to be processed, and outputs the packet to the transmission unit 12 (step S71 after YES in step S70). Then, the transmission unit 12 transmits the packet from the output port specified using the updated transfer rule table 16 (step S72).

Thus, according to the third embodiment, the port of the destination of the packet is specified and the transfer rule table 16 is updated using one packet, the communicating process is efficiently performed.

Fourth Embodiment

Described below is the fourth embodiment in which the default transfer rule 17 is generated by the control device 30. The control device 80 may obtain the default transfer rule 17 for each transfer device 10 by the process similar to that of the control device 30.

When the control device 30 exchanges the information about the connection relationship with the transfer device 10 and the terminal 5 between another control device 30, it calculates the default transfer rule 17 on the transfer device 10 which has established the connection with its own device. In this case, the control device 30 obtains for each transfer device 10 a path to reach the transfer device 10 which has established a connection with another control device 30 with the smallest hop count, and calculates the output port for use of the obtained path for each transfer device 10.

Figure 21:
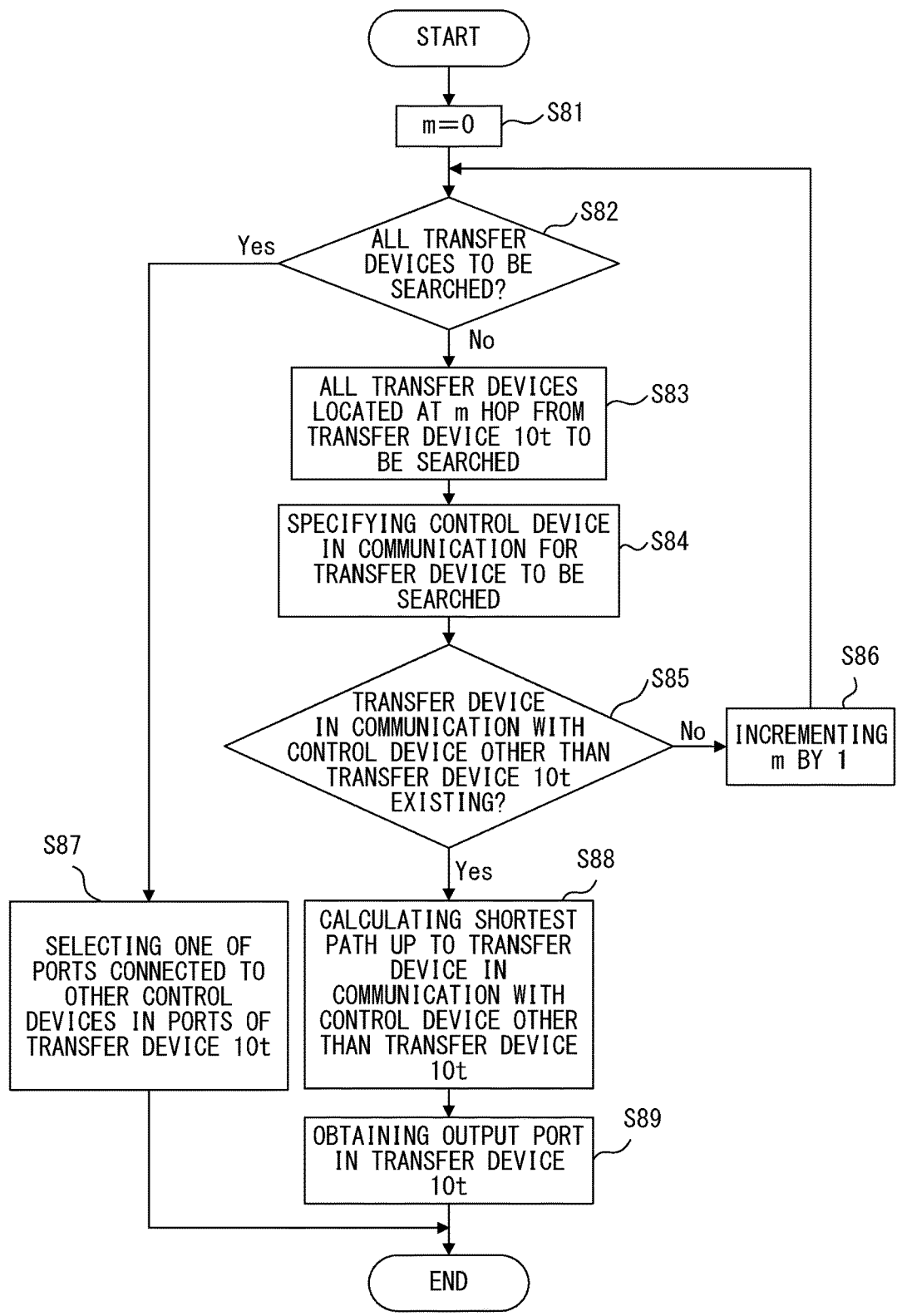
FIG. 21 is a flowchart for explanation of an example of a method of determining a default transfer rule.

FIG. 21 is a flowchart for explanation of an example of a method of determining a default transfer rule. The transfer rule determination unit 51 selects a target for which the default transfer rule 17 is to be determined in the transfer devices 10 which have established a connection with its own device. For example, the control device 30 calculates the default transfer rule 17 for the transfer device 10 which has newly established a session, and may notifies the device of a result of the calculation. In this case, the connection management unit 33 notifies the transfer rule determination unit 51 of the transfer device 10 which has newly established a session. The device for which the default transfer rule 17 is determined is hereafter referred to as the transfer device 10t.

When the connection management unit 33 notifies the transfer rule determination unit 51 of the information about the transfer device 10t, the transfer rule determination unit 51 defines the transfer device 10t as the device for which the default transfer rule 17 is to be obtained, and sets the variable m to 0 (step S81). The variable m is used in specifying the hop count from the transfer device 10t. The transfer rule determination unit 51 judges whether or not all transfer devices 10 in the network have been defined as the targets of the search (step S82). If all transfer devices 10 in the network are not searched, the transfer rule determination unit 51 sets all transfer devices 10 located at m hops from the transfer device 10t as the targets of the search (step S83 after NO in step S82). Furthermore, the transfer rule determination unit 51 specifies the control device in communication for the transfer device 10 to be searched (step S84). The transfer rule determination unit 51 judges whether or not there is a transfer device 10 in communication with a control device 30 other than the transfer device 10t (step S85). If there is not a transfer device 10 in communication with the control device 30 other than the transfer device 10t, the transfer rule determination unit 51 increments by 1 the value of m, and repeats performing the processes in and after step S82 (step S86 after NO in step S85).

On the other hand, when there is a transfer device 10 in communication with the control device 30 other than the transfer device 10t, the transfer rule determination unit 51 notifies the path calculation unit 52 of the transfer device 10 in communication with the control device 30 other than the transfer device 10t (YES in step S85). The path calculation unit 52 calculates the shortest path from the transfer device 10t when the transfer device 10 notified from the transfer rule determination unit 51 is defined as an end point (step S88). The transfer rule determination unit 51 obtains the output port of the transfer device 10t to use the path obtained by the path calculation unit 52 (step S89).

For example, assume that the control device 30b has established a session with the transfer device 10d before the control device 30a becomes faulty in the network illustrated in FIG. 6. Then, the transfer rule determination unit 51b specifies that the transfer devices 10c and 10a are located at the first hop from the transfer device 10d. Furthermore, both of the transfer devices 10c and 10a are communicating with the control device 30a. Then, further assume that the path calculation unit 52b also considers the status of the path, and uses the path from the transfer device 10d to the transfer device 10c in calculating the default transfer rule 17. Then, the transfer rule determination unit 51b determines the output from the port Po 4 as the default transfer rule 17 for use by the transfer device 10d. The transfer rule determination unit 51b notifies the transfer device 10d of the default transfer rule 17.

When it is judged in step S82 that all transfer devices 10 are to be searched, the transfer rule determination unit 51 judges that there is no transfer device 10 connected to the control device 30 other than its own device (YES in step S82). Then, the transfer rule determination unit 51 selects at random one of the ports connected to other transfer devices 10 in the ports of the transfer device 10t (step S87). The transfer rule determination unit 51 notifies the transfer device 10t by defining the output of a packet from the selected port as the default transfer rule 17.

Thus, when the default transfer rule 17 is determined by the control device 30, the transfer device 10 may transfer a packet to the transfer device 10 capable of communicating with the control device 30 which may provide a transfer rule with the smallest possible hop count when a transfer rule is not acquired. Therefore, the communicating process may be efficiently performed.

The fourth embodiment is used by combination with any other embodiments including the first through third embodiments.

Others the embodiments are not limited to those described above, but may be varied in many ways. Described below are some examples.

In case 2 according to the first embodiment, the transfer rule determination unit 51 in the control device 30 determines whether or not an inquiry about a transfer rule is to be accepted as a result of the comparison between the process load and the threshold, but the size of the load in the control device 30 may be estimated by the transfer device 10. For example, the acquisition unit 22a of the transfer device 10a may compare the number of request messages transmitted to the control device 30a per unit time with the threshold stored in advance. The acquisition unit 22a judges that the process load of the control device 30a is heavy if the number of request messages transmitted to the control device 30a per unit time exceeds the threshold, and stops transmitting a request message to the control device 30a. Therefore, the transfer device 10a performs the process in procedure Pr 25. The transfer device 10b estimates that the load of the control device 30a is heavy because the fault information about the fault cause field value of 3 is included in the packet P5 received from the transfer device 10a. Then, the transfer device 10b also stops transmitting a request message to the control device 30a, and performs the process in procedure Pr 26. The transfer device 10c also operates similarly as with the transfer device 10b. With the variations, although the control device 30a does not transmit the stop message 93a, the transmission of the request message to the control device 30a is stopped if it is judged that the load of the control device 30a is heavy. Therefore, the transmission of the request message to the control device 30a may be stopped although the process load of the control device 30a is so heavy as to disable the stop message 93a to be generated.

In the second embodiment, as described above, the control device 80 deletes a fault information header when a packet including an output port information header is generated. However, the control device 80 may generate a packet with the output port information header added, and with the fault information header included. In this case, after the transfer device 10 which has processed the entry whose termination flag in the output port information header is set as TRUE deletes from the packet both of the output port information header and the fault information header, the transfer device 10 performs the transferring process. Similarly in the third embodiment, the control device 80 is not to delete the fault information header when a packet including the transfer rule change header is generated. Also in this case, after the transfer device 10 which has processed the entry whose termination flag is set as TRUE deletes from the packet both of the transfer rule change header and the fault information header, the transfer device 10 performs the transferring process.

For comprehensibility in the explanation above, each transfer device 10 has established a session with one control device 30, but the transfer device 10 may establish a session simultaneously with a plurality of control devices 30. In this case, one of the control devices 30 which have established a session provides a transfer rule, and other control devices 30 do not provide a transfer rule. The control device 30 which notifies of a transfer rule is hereafter referred to as a master controller, and the control device 30 which does not notify of a transfer rule is hereafter referred to as a slave controller. By the communications among the control devices 30 and the communications between the control device 30 and the adjustment device 70, it is assumed that each control device 30 may specify a master controller and a slave controller for each transfer device 10. Furthermore, when a master controller becomes faulty or when the load of a master controller is heavy, it is assumed that the transfer device 10 may set a slave controller into a master controller, and a transfer rule may be acquired from a new master controller. The same holds true with the control device 80.

In the fourth embodiment, when the transfer device 10 establishes a session with a plurality of control devices 30 and 80, the default transfer rule 17 is newly calculated when the transfer device 10 changes a master controller. Upon receipt of notification of the default transfer rule 17 from the new master controller, the transfer device 10 updates the default transfer rule 17. Therefore, the transfer device 10 may change the default transfer rule 17 depending on the changed of the master controller.

Furthermore, in any embodiment, the control devices 30 and 80 may share the information such as the connection relationship between the transfer device 10 and the terminal 5 in the network using any of the networks N1 and N2 illustrated in FIG. 4.

In the explanation of the first through fourth embodiments, when the transfer device 10 performs a transferring process using the default transfer rule 17, fault information is added to a packet, but the transfer device 10 may be varied so that information other than disable information is not to be added to a packet. For example, in case 1 or 2 according to the first embodiment, when the control device 30 becomes faulty or when the load of the control device 30 exceeds a threshold, and when there is no applicable transfer rule, the transfer device 10 adds disable information to a packet. On the other hand, when a transfer rule is not acquired because the session between the 10 and the control device 30 is disconnected as in case 3 according to the first embodiment, the transfer device 10 does not add disable information or fault information to the packet.

Furthermore, the control device 30 may generate a stop message although the load of the control device 30 becomes heavy due to the factor other than the reception of a request message for a transfer rule. Also in this case, as described above with reference to the first embodiment, the transfer device 10 does not request the control device 30 as the source of the stop message to transmit a transfer rule.

Assume that the control device 80 may generate a stop message as with the control device 30.

In the explanation of the second embodiment, the information about the output port used in each transfer device 10 is included in the output port information header, but the information about the output port may be recorded on the part other than the header. Similarly, the information included in the transfer rule change header explained with reference to the third embodiment may be included in the area other than the header of the packet.

In the first through fourth embodiments, as explained with reference to FIG. 1, a variation may be realized so that the addition unit 23 does not add disable information for the packet to which disable information has already been added. In this case, when the disable information about the control device 30 as he destination of the transfer rule in the packet input from the destination specification unit 14, the judgment unit 21 specifies an output port of the packet using the default transfer rule 17. Furthermore, the judgment unit 21 outputs the packet to the transmission unit 12 with the information about the specified port. The transmission unit 12 transmits the input packet from the notified output port.

As described above, the efficiency of the communicating process may be improved by applying the method according to the embodiments.

All examples and conditional language provided herein are intended for the pedagogical purposes of aiding the reader in understanding the invention and the concepts contributed by the inventor to further the art, and are to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A transfer device in a network provided with a plurality of control devices, the transfer device comprising:
   a network connection device configured to communicate a target packet to be transferred;
   a memory configured to store a transfer rule which has been received by the network connection device from a determination device as a control device which determines a transfer rule indicating a method of a process performed by the transfer device; and
   a processor, wherein:
   the processor
      judges whether or not disable information indicating that the transfer rule is not acquired from the determination device is included in the target packet when a transfer rule applicable to the target packet is not stored in the memory; and
      outputs to the network connection device the target packet without requesting the transfer rule applicable to the target packet to the determination device when the disable information is not included, and
   the network connection device transmits the target packet to another transfer device.

2. The transfer device according to claim 1, wherein:
   the processor
      performs a process for acquiring the transfer rule applicable to the target packet from the determination device when the transfer rule applicable to the target packet is not stored in the memory, and the disable information is not included in the target packet; and adds the disable information to the target packet when the transfer rule applicable to the target packet is not acquired from the determination device within a specified time, and the network connection device transmits a target packet to which the disable information has been added to the other transfer device.

3. The transfer device according to claim 1, wherein: the processor performs a process for acquiring the transfer rule applicable to the target packet from the determination device when the transfer rule applicable to the target packet is not stored in the memory, and the disable information is not included in the target packet;

specifies a destination of the target packet based on a acquired transfer rule when the transfer rule applicable to the target packet is acquired from the determination device; and converts the target packet into a transfer packet by deleting fault information from the target packet when the fault information for notification that a fault has occurred in acquiring a transfer rule from any of the plurality of control devices other than the determination device is included in the target packet, and the destination of the target packet is specified; and the network connection device transmits the transfer packet to the destination.

4. The transfer device according to claim 2, wherein the processor specifies a destination of the target packet based on an acquired transfer rule when the transfer rule applicable to the target packet is acquired from the determination device; and converts the target packet into a transfer packet by deleting fault information from the target packet when the fault information for notification that a fault has occurred in acquiring a transfer rule from any of the plurality of control devices other than the determination device is included in the target packet, and the destination of the target packet is specified; and the network connection device transmits the transfer packet to the destination.

5. The transfer device according to claim 3, further comprising a plurality of ports, wherein the processor generates a request message for requesting the determination device to transmit the transfer rule applicable to the target packet;

the network connection device transmits the request message to the determination device;

the processor specifies a port associated with an identifier of the transfer device in output port information when the output port information in which an identifier of each transfer device included in a path to a destination of the target packet is associated with an output port in a transfer device identified by the identifier is included in a reply message in reply to the request message; and the network connection device uses a port specified by the processor among the plurality of ports in a transferring process.

6. The transfer device according to claim 3, wherein:

the processor generates a request message for requesting the determination device to transmit the transfer rule applicable to the target packet;

the network connection device transmits the request message to the determination device; and the processor changes information stored in the memory using a transfer rule associated with an identifier of the transfer device in transfer rule change information when the transfer rule change information in which an identifier of each transfer device included in a path to a destination of the target packet is associated with a transfer rule used in a transfer device identified by the identifier is included in a reply message for reply of the request message; and specifies the destination using information after a change of the memory.

7. The transfer device according to claim 1, wherein the disable information is information for notification that a fault has occurred in the determination device, or information for notification that a process load of the determination device has exceeded a specified threshold.

8. A control device in a network provided with a plurality of control devices and a plurality of transfer devices, the control device comprising:

a network connection device configured to receive a request message for a transfer rule indicating a method of a transferring process on a packet; and a processor configured to determine the transfer rule, wherein:

the processor extracts from the request message a target packet as a packet to be processed using the transfer rule, and adds information about a path to a destination of the target packet from a source of the request message to the target packet when disable information indicating that a transfer rule is not to be acquired from any of the plurality of control devices is included in the target packet; and the network connection device transmits to the source of the request message the target packet to which the information about the path is added.

9. The control device according to claim 8, further comprising a memory configured to store network information in which a number of a port provided for the transfer device is associated with a device connected through the port for each of the plurality of transfer devices, wherein:

the processor performs a calculating process of determining the path;

adds information in which an identifier of each transfer device included in the path is associated with an output port in a transfer device identified by the identifier to the target packet using a calculation result and the network information.

10. The control device according to claim 8 further comprising memory configured to store network information in which a number of a port provided for the transfer device is associated with a device connected through the port for each of the plurality of transfer devices, wherein:

the processor performs a calculating process for determination of the path using the network information;

determines a transfer rule for each transfer device included in the path; and includes information in which an identifier of each transfer device included in the path is associated with the transfer rule used by a transfer device identified by the identifier in the target packet.

11. The control device according to claim 9, wherein:
when a connection is established between a first transfer device in the plurality of transfer devices and the control device, the processor
   searches using the network information a second transfer device as a transfer device having a relatively small hop count from a first transfer device in transfer devices notified of the transfer rule from another control device, and
   specifies an output port in the first transfer device when a path from the first transfer device to the second transfer device is used as an output port of the target packet when the first transfer device is unable to acquire the transfer rule from the control device.

12. A transfer method used in a network provided with a first control device, a second control device, and a plurality of transfer devices, and which determines a transfer rule indicating a method of a process performed by first and second transfer devices, the transfer method comprising:
   generating, by the first transfer device, a second packet by adding disable information indicating that a transfer rule is not acquired from the first control device to a first packet to be processed when the transfer rule applicable to the first packet is not successfully acquired from the first control device;
   transmitting, by the first transfer device, the second packet to the second transfer device; and
   transferring, by the second transfer device, the second packet to a third transfer device without requesting a transfer rule to the first control device although no transfer rule applicable to the second packet is held when the disable information in the second packet is detected.

13. The transfer method according to claim 12, further comprising:
   determining, by the second control device, a process to be processed by the third transfer device;
   transmitting, by the third transfer device, a request message for information indicating a process applicable to the second packet to the second control device when a process applicable to the second packet is not held;
   converting, by the third transfer device, the second packet into the first packet by deleting the disable information from the second packet when the process applicable to the second packet is notified from the second control device; and
   processing, by the third transfer device, the first packet using information acquired from the second control device.

14. The transfer method according to claim 13, wherein the request message includes the second packet,
the transfer method further comprising:
   determining, by the second control device, a path from the third transfer device to a destination of the first packet when the request message is received;
   adding, by the second control device, output port information in which an identifier of each transfer device included in the path associated with an output port in a transfer device identified by the identifier to the first packet, and transmitting the first packet to the third transfer device; and
   outputting, by the third transfer device, a packet including the output port information from a port associated with an identifier of the third transfer device in the output port information.

* * * * *